(12) United States Patent
Griffith et al.

(10) Patent No.: US 10,107,452 B2
(45) Date of Patent: Oct. 23, 2018

(54) COILED COMBUSTIBLE FUEL FLUID STORAGE SYSTEM AND METHOD

(71) Applicant: Other Lab, LLC, San Francisco, CA (US)

(72) Inventors: Saul Griffith, San Francisco, CA (US); Peter S. Lynn, San Francisco, CA (US); Samuel Eli Calisch, San Francisco, CA (US); Tucker Gilman, San Francisco, CA (US); Kevin Simon, San Francisco, CA (US)

(73) Assignee: Other Lab, LLC, San Francisco, CA (US)

( * ) Notice: Subject to any disclaimer, the term of this patent is extended or adjusted under 35 U.S.C. 154(b) by 64 days.

(21) Appl. No.: 15/232,355

(22) Filed: Aug. 9, 2016

(65) Prior Publication Data

US 2016/0348838 A1    Dec. 1, 2016

Related U.S. Application Data

(63) Continuation of application No. 14/624,370, filed on Feb. 17, 2015, now abandoned, which is a
(Continued)

(51) Int. Cl.
*F17C 1/00* (2006.01)
*B60K 15/03* (2006.01)

(52) U.S. Cl.
CPC ........ *F17C 1/005* (2013.01); *B60K 15/03006* (2013.01); *F17C 1/00* (2013.01); *B60K 2015/03315* (2013.01); *F17C 2201/0109* (2013.01); *F17C 2201/0123* (2013.01); *F17C 2201/0138* (2013.01); *F17C 2201/054* (2013.01); *F17C 2201/056* (2013.01); *F17C 2203/0636* (2013.01); *F17C 2203/0646* (2013.01); *F17C 2203/0673* (2013.01);
(Continued)

(58) Field of Classification Search
CPC .............. F17C 1/005; F17C 2201/0138; F17C 2205/0352; B60K 15/03006
USPC .................................................. 220/562, 581
See application file for complete search history.

(56) References Cited

U.S. PATENT DOCUMENTS 2,380,372 A * 7/1945 Alderfer ................ B64D 17/54
                                                            128/205.22
4,139,019 A    2/1979 Bresie et al.
(Continued)

FOREIGN PATENT DOCUMENTS

CA      2 636 100       12/2009
CN     1036534 A        10/1989
(Continued)

OTHER PUBLICATIONS

Supplementary European Search Report issued in EP Patent Application No. 13784302.5, dated Dec. 11, 2015, 2 pages.
(Continued)

*Primary Examiner* — Stephen Castellano
(74) *Attorney, Agent, or Firm* — Davis Wright Tremaine, LLP

(57) ABSTRACT

A system for storing natural gas comprises a plurality of straight sections of tube. The plurality of straight sections of tube are dense packed. The plurality of straight sections of tube are configured to fill a designated volume.

19 Claims, 13 Drawing Sheets

Related U.S. Application Data continuation of application No. 13/887,201, filed on May 3, 2013, now Pat. No. 9,217,538.

(60) Provisional application No. 61/642,388, filed on May 3, 2012, provisional application No. 61/766,394, filed on Feb. 19, 2013.

(52) U.S. Cl.
CPC .......... *F17C 2205/0107* (2013.01); *F17C 2205/0111* (2013.01); *F17C 2205/0115* (2013.01); *F17C 2205/0134* (2013.01); *F17C 2205/0352* (2013.01); *F17C 2209/2181* (2013.01); *F17C 2209/221* (2013.01); *F17C 2221/033* (2013.01); *F17C 2223/0123* (2013.01); *F17C 2260/018* (2013.01); *F17C 2270/0168* (2013.01)

(56) References Cited

U.S. PATENT DOCUMENTS

| | | |
|---|---|---|
| 4,253,454 A | 3/1981 | Warncke |
| 4,932,403 A | 6/1990 | Scholley |
| 5,036,845 A | 8/1991 | Scholley |
| 5,653,358 A | 8/1997 | Sneddon |
| 5,839,383 A | 11/1998 | Stenning et al. |
| 6,116,464 A | 9/2000 | Sanders |
| 6,293,590 B1 | 9/2001 | Ogasa |
| 6,527,075 B1 | 3/2003 | Izuchukwu et al. |
| 6,579,401 B1 | 6/2003 | Izuchukwu et al. |
| 9,217,538 B2 | 12/2015 | Griffith et al. |
| 2004/0145091 A1 | 7/2004 | Willig et al. |
| 2004/0216656 A1 | 11/2004 | Fitzpatrick et al. |
| 2005/0205137 A1 | 9/2005 | Pouchkarev |
| 2008/0098562 A1 | 5/2008 | Tagliaferri |
| 2009/0308475 A1 | 12/2009 | Stringfellow et al. |
| 2011/0041518 A1 | 2/2011 | Peterson et al. |
| 2014/0305951 A1 | 10/2014 | Griffith et al. |
| 2015/0048095 A1 | 2/2015 | Sanders |
| 2016/0018057 A1 | 1/2016 | Griffith et al. |
| 2016/0363265 A1 | 12/2016 | Griffith et al. |

FOREIGN PATENT DOCUMENTS

| | | |
|---|---|---|
| CN | 1231639 A | 10/1999 |
| CN | 2416338 Y | 1/2001 |
| CN | 1518511 A | 8/2004 |
| EP | 2 404 872 | 1/2012 |
| EP | 3141793 A1 | 3/2017 |
| RU | 42863 U1 | 12/2004 |
| RU | 81568 U1 | 3/2009 |
| RU | 2426024 C2 | 8/2011 |
| RU | 141427 U1 | 6/2014 |
| WO | 199814362 | 4/1998 |
| WO | 200195967 A1 | 12/2001 |
| WO | 2001095966 A1 | 12/2001 |
| WO | 0239010 A2 | 5/2002 |
| WO | 2008081401 | 7/2008 |
| WO | 2010107317 | 9/2010 |
| WO | 2013056785 A2 | 4/2013 |
| WO | 2013166452 A1 | 11/2013 |
| WO | 2014123928 A1 | 8/2014 |

OTHER PUBLICATIONS

International Search Report and Written Opinion dated Aug. 27, 2013, International Patent Application No. PCT/US2013/039565, filed May 3, 2013, 13 pages.

International Search Report and Written Opinion dated Mar. 16, 2017, International Patent Application No. PCT/US2016/064796, filed Dec. 2, 2016, six pages.

International Search Report and Written Opinion dated Mar. 23, 2017, International Patent Application No. PCT/US2016/037633, eight pages.

International Search Report and Written Opinion dated May 14, 2014, International Patent Application No. PCT/US2014/014729, filed Feb. 4, 2014, 11 pages.

International Search Report and Written Opinion dated Jun. 21, 2018, International Patent Application No. PCT/US2018/025280, filed Mar. 29, 2018, 7 pages.

International Search Report and Written Opinion dated Jun. 28, 2018, International Patent Application No. PCT/US2018/025283, filed Mar. 29, 2018, 8 pages.

International Search Report and Written Opinion dated Feb. 21, 2018, International Patent Application No. PCT/US2017/058068, filed Oct. 24, 2017, 8 pages.

\* cited by examiner

DETAIL A

DETAIL B

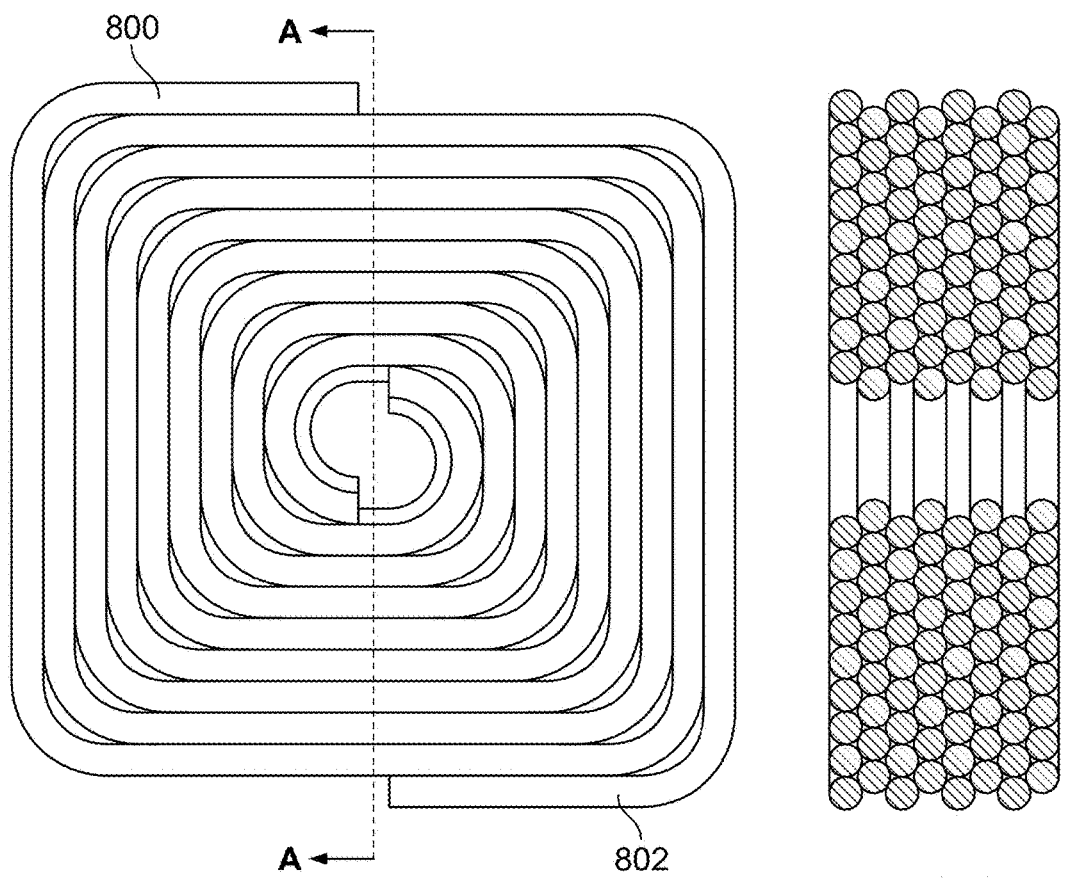
FIG. 8A
FIG. 8B
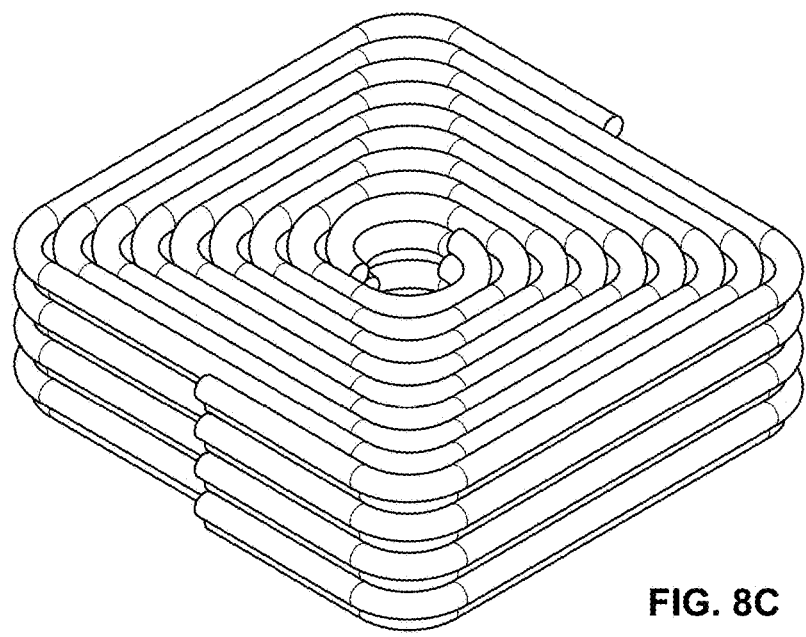
FIG. 8C

COILED COMBUSTIBLE FUEL FLUID STORAGE SYSTEM AND METHOD

CROSS REFERENCE TO OTHER APPLICATIONS

This application is a continuation of, and claims priority to, U.S. Non-Provisional patent application Ser. No. 14/624,370, entitled COILED NATURAL GAS STORAGE SYSTEM AND METHOD and filed Feb. 17, 2015, which is a continuation of, and claims priority to, U.S. Non-Provisional patent application Ser. No. 13/887,201, entitled CONFORMING NATURAL GAS STORAGE and filed May 3, 2013, which claims priority to U.S. Provisional Patent Application No. 61/642,388, entitled CONFORMING ENERGY STORAGE and filed May 3, 2012, and to U.S. Provisional Patent Application No. 61/766,394, entitled NATURAL GAS INTESTINE PACKED STORAGE TANK and filed Feb. 19, 2013, each of which is incorporated herein by reference for all purposes.

STATEMENT REGARDING FEDERALLY-SPONSORED RESEARCH

This invention was made with Government support under DE-AR0000255 awarded by the US DOE. The Government has certain rights in this invention.

BACKGROUND OF THE INVENTION

Since the 1990's heavy vehicles have been taking advantage of compressed natural gas (CNG) engines. However, light vehicles, such as passenger cars, still have yet to achieve widespread adoption. Both private and public players began to identify technological hurdles to CNG passenger vehicle growth. Industry realized that if certain storage issues could be solved natural gas offered incredible untapped opportunity. However, current CNG storage solutions, both for integrated vehicles and converted vehicles, are still bulky and expensive cylinder based systems. For the integrated systems, various sized cylindrical tanks are integrated into the vehicle chassis design. For the converted vehicles, a big tank is placed in the trunk, eliminating storage or spare tires.

BRIEF DESCRIPTION OF THE DRAWINGS

Various embodiments of the invention are disclosed in the following detailed description and the accompanying drawings.

FIGS. 8A-C are diagrams illustrating embodiments of bent square spirals.

DETAILED DESCRIPTION

Figure 1:
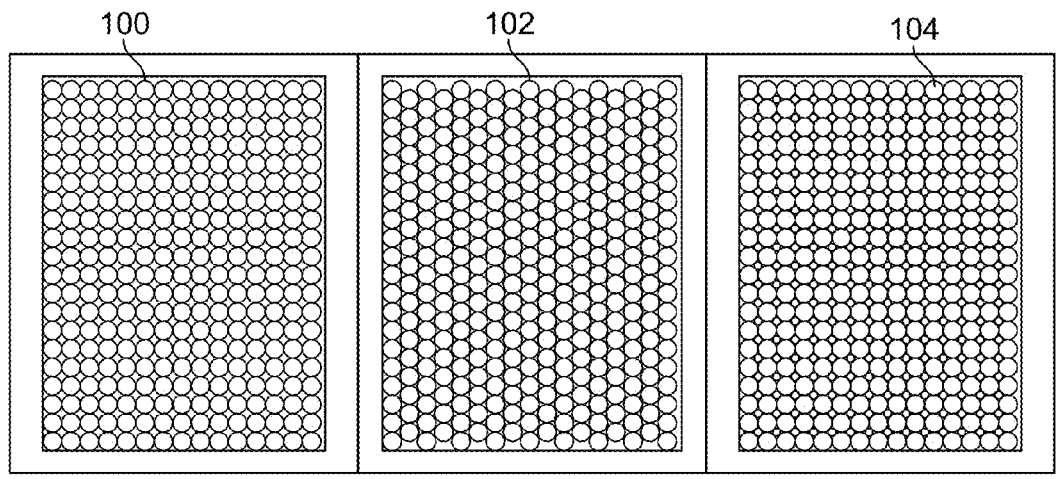
FIG. 1 is a diagram illustrating an embodiment of a cross section at a middle of a tank.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for storing natural gas is disclosed. The system comprises a plurality of straight sections of tube. The plurality of straight sections of tube are dense packed. The plurality of straight sections of tube are configured to fill a designated volume.

In 1890 Giuseppe Peano discovered a class of curves that fill 2-dimensional space, a result which Hilbert extended to 3-dimensional cubes. It can be shown that such a curve can densely fill any 2- or 3-dimensional (2D or 3D) shape. Based on these insights, an Intestine Storage Concept is disclosed, a compressed gas storage tank modeled after the human intestine, an example of a high density curve efficiently filling an irregular volume.

A key insight here is that in the design of a cylindrical tank the ratio of the tank mass to the contained gas mass is not dependent on tank geometry. The mass of the material used, and thus the bulk material cost is constant for a given pressure and material yield stress. With no penalty paid (in material cost or packing density) for moving to small diameter tubes, the ability is gained to fit the tank in to any 3D shape desired—for example embedded in the chassis of the vehicle. In the following, several options for creating a compressed natural gas (CNG) tank with small diameter tubing are disclosed. Also, how to pack that tubing into desirable geometries for use in the automotive industry is disclosed. Important design considerations are discussed: material stress, diffusion through the tank, and possible tank failure due to creep, fatigue, or thermal conditions.

It can be shown that it is possible to fill arbitrary shapes with small tubes without a loss in mass, here we discuss possible ways to pack these tubes. Because it is likely difficult, from a manufacturing stand point, to use actual Hilbert curves as a packing scheme alternative packing geometries are examined, and it is considered how well they fit into space (conformability factor). The conformability of a tank design (that is, the ratio of gas volume contained in the tank to the volume of the smallest bounding box of the tank) is a function of tube geometry, and packing geometry. To calculate conformability factor exactly, a precise definition of the packing scheme considered is needed, including bends.

In various embodiments, the tank has an inlet coupler at one end, the tank has multiple inlet couplers, the tank has an inlet coupler after a taper from the one or more straight sections of tube, the tank has an inlet coupler coupled to a reduced section of tube, or any other appropriate manner for coupling to the tank for access.

FIG. 1 is a diagram illustrating an embodiment of a cross section at a middle of a tank. In the example shown, a plurality of circular cross sections of the tubes are packed into a rectangular bounding box. The packing densities for these packing schemes, considered without boundary conditions, are well known: hexagonal pack 102, with a packing density of $\pi/6\sqrt{3}$ or about 91%; rectangular pack 100, with a packing density of $\pi/4$ or about 78.5%; and, one of many binary packing schemes 104, with two different radii tubes with packing density of ~92%. Binary pack 104 has tubes with a diameter ratio of $\sqrt{2}-1$. A binary packing scheme increases packing efficiencies and could be used to add additional longitudinal strength.

Figure 2:
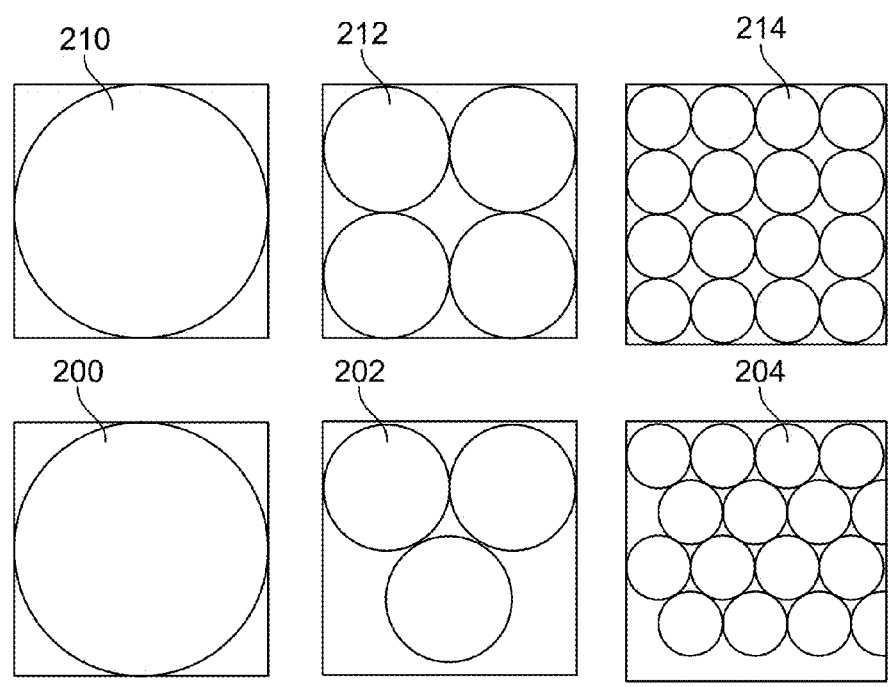
FIG. 2 is a diagram illustrating an embodiment of a cross section of a low number of tanks in a design.

FIG. 2 is a diagram illustrating an embodiment of a cross section of a low number of tanks in a design. In the example shown, hexagonal and rectangular packing in a bounding box is shown for 1, 4, and 16 cross sectional tanks (e.g., hexagonal 200, 202, and 204, and rectangular 210, 212, and 214). At low number of tanks (circles) boundary conditions dominate the packing and rectangular packing can be more efficient. As the ratio of radius to bounding box gets larger, boundary conditions become less significant as the packing efficiencies approach ideal. Since hexagonal has a greater ideal packing efficiency, at some point (e.g., some radius, given a particular bounding box) the hexagonally packed tubes will always be better than the best rectangular packing. This question, what is the radius at which hexagonal packing is always better, can only truly be answered once a bounding box is chosen, since boundary conditions are heavily dependent on bounding box. Once a bounding box is chosen the maximum radius or tubes, and number of tubes can be determined which will ensure highest packing efficiency.

For straight cylindrical tubes, far away from the ends, the stress along the length remains constant. The magnitude of this stress depends on the radius and wall thickness of the straight lengths. Stress concentrations may also develop at tube ends, bends, or fittings.

Polymers or metals can be extruded into tubes that can be bent and packed into dense geometries. In order to develop an understanding of the load bearing capabilities of these tubes, a single length of cylindrical tubing without considering the end conditions is examined. For geometries where $t/r \leq 1/20$ we can use thin-wall theory to calculate the principal stresses in a cylindrical vessel. The stress is as follows:

1. Hoop Stress ($\sigma h$). We assume this to be uniform across wall thickness.
2. Longitudinal Stress ($\sigma l$). This stress exists for cylinders with end caps. We assume this is uniform across a section and sufficiently far from end caps. Stress concentrations will need to be dealt with separately
3. Radial Stress ($\sigma r$). Under the thin-walled assumption, the radial Stress is insignificant compared to the longitudinal and hoop stresses.

For hoop stress it is assumed that the stress in the material is only due to the pressure inside the tank. The hoop stress acts circumferentially around the cylinder. Since this force is twice the longitudinal stress, it sets the required thickness of the tank at a given pressure and material yield stress.

$$\sigma_h = \frac{\sigma_y}{fs} = \frac{Pr}{t}$$

$$t = \frac{Prfs}{\sigma_y}$$

with: Yield Stress ($\sigma_y$), Pressure (P), Inner Radius (r), Wall Thickness (t), Factor of Safety (fs)

The axial stress can be written as:

$$\sigma a = \frac{P}{\frac{R^2}{r} - 1}$$

If we divide the hoop stress by the axial stress we get:

$$\frac{\sigma h}{\sigma a} = \frac{R}{r} + 1$$

Again using a thin wall assumption: $r \approx R$, we can say:

$$\frac{\sigma h}{\sigma a} \simeq 2$$

which dictates that the hoop stress is about twice that of the axial stress.

The tank mass is a function of tank pressure, volume and material properties. Therefore, tank mass and bulk material cost are not a function of tube radius. The equation for tank mass, for a single cross section straight cylindrical tube is:

$$Mtank = \rho V \left( \left( \frac{pfs}{\sigma_y} + 1 \right)^2 - 1 \right)$$

Another important metric for CNG vehicles is overall tank energy density. For a fixed internal volume, energy density is determined from tank mass, where higher strength materials will drive down mass, and increase energy density.

High strength fibers such as Carbon and ultrahigh molecular weight polyethylene (UHMWPE) have greater strength-weight ratios than metals, making them attractive materials for CNG applications. By winding or weaving a fiber around a pressure vessel, the very strong fibers significantly increase the burst pressure of a vessel. Dry fiber reinforced vessels are made by weaving, braiding, or winding high strength fibers around a pressure vessel.

By optimally orienting the fibers, it is possible to balance the hoop and longitudinal stress evenly. The ideal angle to achieve this is called the hose angle. This angle makes sure that material strengths are being used the most effectively, which is valuable when the strength-weight ratio is driving design decisions.

In some embodiments, a fiber reinforced composites are more durable than dry fiber reinforcement because the matrix encases and protects the fibers. Carbon, the strongest commercially available fiber to date, is unfeasible in a dry application because the fibers are too fragile. The drawback of fiber reinforced composites is an increased manufacturing cost associated with laying the fibers up in a matrix.

To confirm that adding bends does not compromise the strength of the structure, the stresses in a pressurized bend needed to be determined. A torus, or section of a bend, can be geometrically represented as a circular cross-section of radius $r_o$ revolved around a fixed axis distance $R_o$ from the center of the circle. The hoop stress in a section of the torus can be determined by applying conservation of momentum to two connected cross-sections of tube. This results in a general equation for pressure vessels that has a constant that needs to be determined. By examining the torus at the centerline where $r=R_o$ and $\alpha=\pi/2$, the constant can be found:

$$R_o \sigma_h \cos\frac{\pi}{2} - \frac{1}{2}cR_o^2 = const$$

$$const = \frac{-cR_o^2}{2}$$

So, the equation for hoop stress in a torus is:

$$\sigma_h = \frac{P}{2t}\left(\frac{r^2 - R_o^2}{r\cos\alpha}\right)$$

where $\alpha$ is the tangential angle of the circular cross section, c is substituted for $$\frac{P}{t}$$

and r is the distance that the point is from the axis of rotation. Alternatively:

$r = R_o + r_o \cos \alpha$ or:

$$\frac{c\alpha_s(r^2 - R_o^2)}{2r\cos^2\alpha} - \frac{\sigma_l}{r} = \frac{-c}{\cos\alpha}$$

using the fact that $\alpha s = -1/r_o$ for a circle, and substituting in for r:

$$\frac{-c((R_o + r_o\cos\alpha)^2 - R_o^2)}{2(R_o + r_o\cos\alpha)r_0\cos^2\alpha} - \frac{\sigma_l}{R_o + r_o\cos\alpha} = \frac{-c}{\cos\alpha}$$

which simplifies to the equation of longitudinal stress in a straight cylinder $$\sigma l = \frac{Pro}{2}$$

These equations show that longitudinal stress remains unchanged, that hoop stress increases minimally (e.g., 20% with a bend radius of 3.5 tube radii), and that the bend stress can be kept below the failure point of the tube by reducing the radius of the tubes at the bend.

Figure 3:
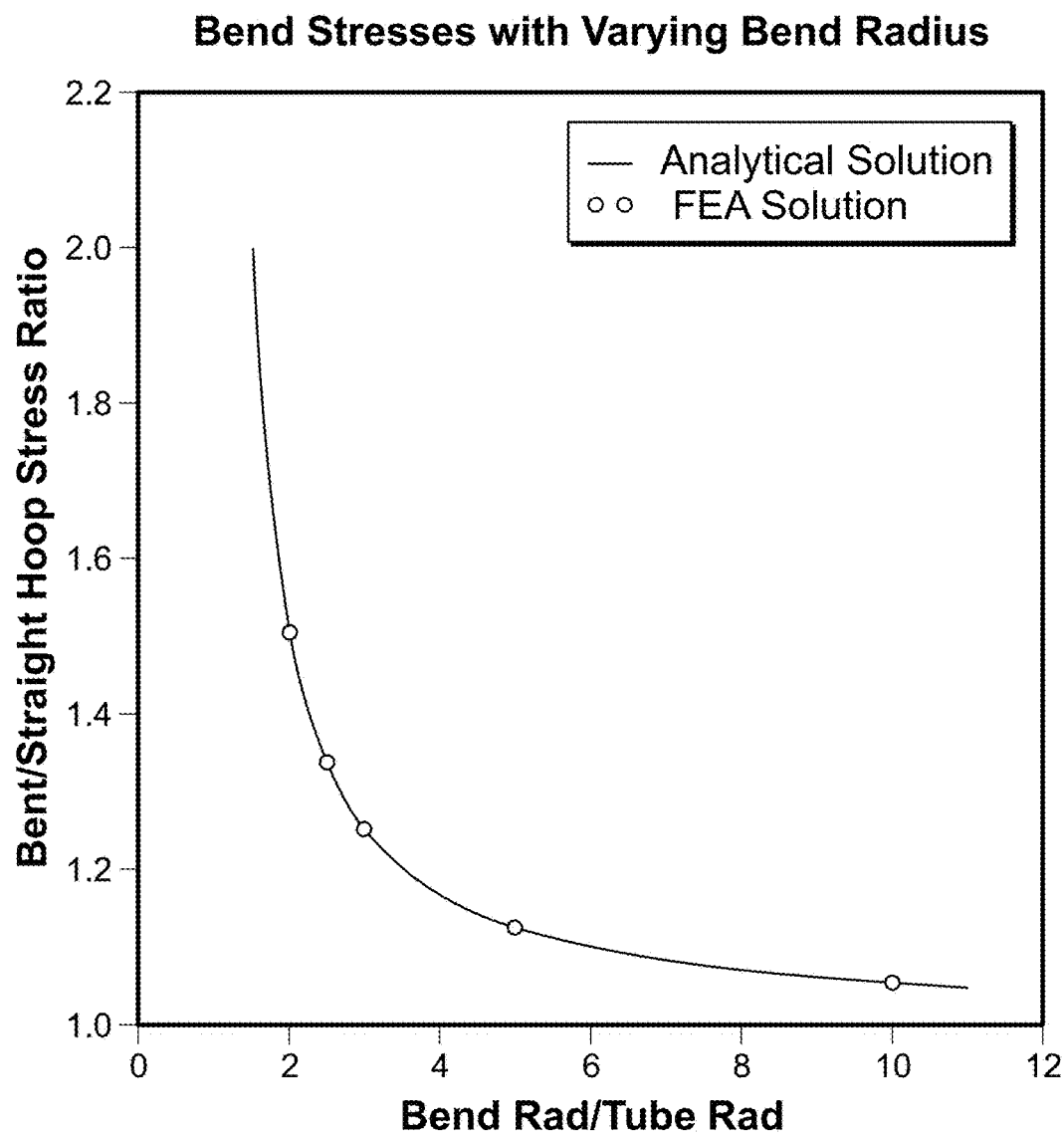
FIG. 3 is a graph illustrating an embodiment of a finite element analysis (FEA) and the analytical solution.

FIG. 3 is a graph illustrating an embodiment of a finite element analysis (FEA) and the analytical solution. In the example shown, the above equations are compared with the results from a FEA in the plot above. The results of the FEA and analytical solutions match within 1%. The results of the analysis show that with a 43% reduction in tube radius at the bends, the same maximum hoop stress is maintained with the same wall thickness. One major difficulty with creating a multi-chamber high pressure tank is connecting the chambers (e.g., tubes in this case) in a manner that does not inhibitively decrease the working pressure or increase the manufacturing cost. There are several options for constructing a tank with many long straight tubes.

FIGS. 4A-4D are diagrams illustrating embodiments of tank construction with straight tubes. In the example shown in FIG. 4A, a plurality of straight sections of tube (e.g., 400) are all connected at an end into a single chamber (e.g., 402). In various embodiments, steel tubes are connected to a manifold (e.g., end chamber) using brazing or welding, Aluminum or carbon fiber tubes are connected using bonding, or any other appropriate connecting manner. In the example shown in FIG. 4B, the tubes are connected in rows to perpendicular tubes, which in turn are connected together with a final, again perpendicular tube (not shown in FIG. 4B). In the example shown in FIG. 4C, the tubes are individually connected in a single long chamber using U fittings (e.g., 414 at the ends, not visible in FIG. 4B) and T junctions (e.g., 410 and 412). In the example shown in FIG. 4C, for an oddly shaped chamber the snaking tube (e.g., tube 430) can be layered in to conform to the space. The sections of straight tube are linked using a narrower tube section that is bent in U shape 432 (e.g., the U fittings). In cross section, the tubes are packed in a hexagonal packing (e.g., 434 with U fittings shown at the ends) in order to achieve a conformal tank to the space that efficiently uses the space. In some embodiments, tube 430 is made from a single polymer chamber, molded into shape, and over braided with a high strength fiber. In some embodiments, the tank is bent into shape before impregnating resin, or otherwise mechanically bound into shape. In the example shown in FIG. 4D, a plurality of straight sections of tube have sections of reduced radius. The sections of reduced radius form the bends that enable the forming of the straight sections of tube into a 3 dimensional shape that fills a designated volume (e.g., a rectangular prism volume in FIG. 4D). Tube 440 shows a three dimensional perspective view. Tube 442 shows a side view of straight sections of tube with smaller diameter bent tubes between the straight sections. Tube 444 shows an end view of the straight sections of tube in a hexagonal dense pack. 448 indicates a region that is enlarged and shown as region indicated by 446.

Figure 5A:
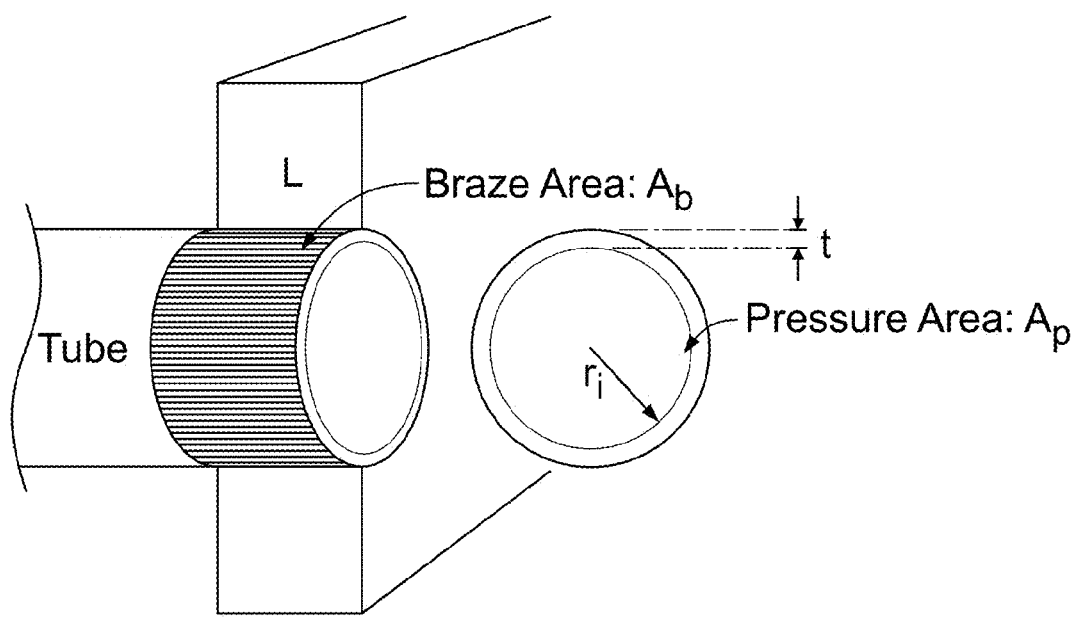
FIGS. 5A and 5B are diagrams illustrating embodiments of brazing areas.
Figure 5B:
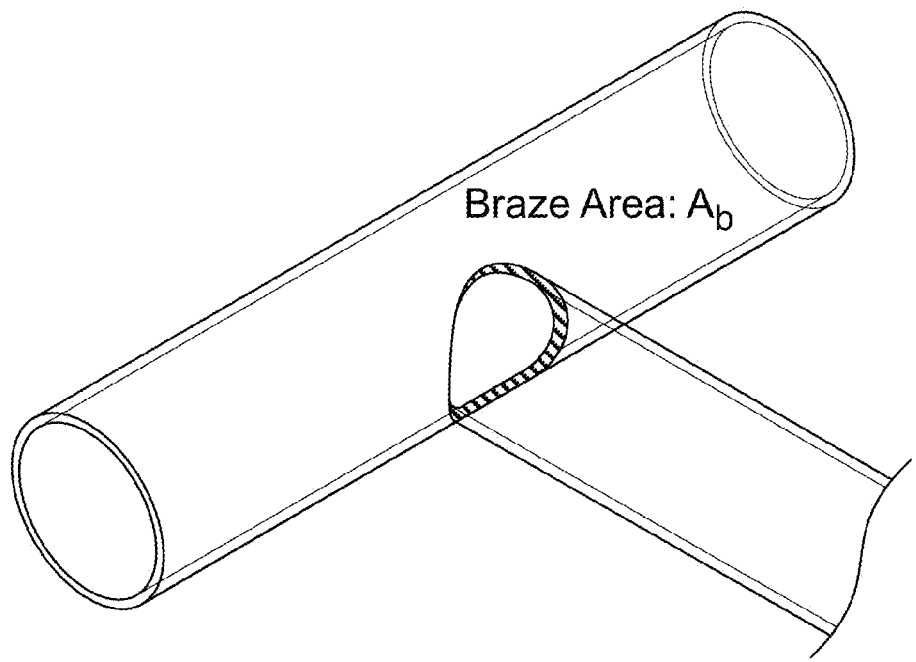

FIGS. 5A and 5B are diagrams illustrating embodiments of brazing areas. In the examples shown, given the maximum allowable stress on a braze, how much overlap area is required to make a safe join can be determined. In some embodiments, cylindrical thin walled tubes are joined into other structures. The two cases of interest in are: 1) joining tubes into circular holes as shown in FIG. 5A (e.g., end caps or U fittings), or 2) joining tubes perpendicularly into other thin walled tubes as shown in FIG. 5B. In some embodiments, for joining a tube into a circular hole (e.g., FIG. 5A), the braze area, or the overlap area is given by $A_b=2\pi r_o l$, where $r_o$ is the tube outer radius (also the circular hole radius) and l is the length of the cylindrical interface (the thickness of the part with the circular opening). The pressure area, or the area that contributes to the sheer stress on the braze join, is given by $A_p=\pi r_i^2$, where $r_i$ is the tube inner radius. The braze area is easy to calculate, but will be a bit trickier with mitered tubes. The wall thickness $t=r_o-r_i$ is set by the material properties at a given inner radius. Setting braze force equal to pressure force, relating inner and outer radius, and solving for braze length gives:

$$lc = \frac{r_i f b}{2\sigma b \left(\frac{1}{P} - \frac{fm}{\sigma y}\right)}$$

For joining one tube into another calculating the braze area becomes more difficult. The path length of the miter can be calculated as:

$$C = 4r \int_0^{\frac{\pi}{2}} \sqrt{\left(1 + \frac{\sin^2(\theta)\cos^2(\theta)}{a^2 - \sin^2(\theta)}\right)} \, d\theta$$

The integral finds the path length around a quarter miter and r is the radius of the mitered tube (smaller tube), while a=R/r the ratio of radii of the large tube to the small. The obvious analogy with π shows us that the 'circumference' of the miter is given as:

$$C = v(a)d$$

where $$v(a) = 2 \int_0^{\frac{\pi}{2}} \sqrt{\left(1 + \frac{\sin^2(\theta)\cos^2(\theta)}{a^2 - \sin^2(\theta)}\right)} \, d\theta$$

and d is the diameter of the small tube. Using v(a), the braze area can be calculated as $A_b=2$ v(a) $r_o l$, where $r_o$ is the smaller tube outer radius and l is the length of the interface (which will be the wall thickness of the larger end tube). Now we can write the braze length can be written as:

$$l_m = \frac{\pi}{v(a)} \frac{r_i f_b}{2\sigma_b \left(\frac{1}{P} - \frac{fm}{\sigma_y}\right)}$$

or $$lm = \left(\frac{\pi}{v}\right) lc$$

as R>>r, v→π and R≥r the circular braze is the worst case scenario.

Unlike liquid fuels, gas fuels can diffuse through nonporous, seamless materials. Excessive diffusion is a concern because lost fuel leads to lost money, shorter range, and explosive gas mixtures. Additionally, diffusion linearly increases with both increasing surface area and decreasing wall thicknesses. The disclosed highly conformable design can achieve acceptable levels of natural gas permeation with both polymer-matrix composites and metal walls. This analysis is based on the solution-diffusion model for permeation through non-glassy polymers. The model assumes two different modes of transportation. The first, adsorption, is linearly approximated by Henry's law of solubility. This model describes the process of the permeate dissolving into and subsequently out of the membrane. The second is diffusion, which is treated as Fickian diffusion. This model approximates the transport of the gas through the membrane directly. The combination of these two modes can be linearly described by a diffusive gas permeability coefficient, which is the product of the solubility coefficient and the diffusion coefficient. This model only holds true when the polymers are below their glass-transition temperature with little or no pores. Given the small range of operating temperatures, Permeability is assumed to be independent of temperature. It is also assumed that permeability is independent of concentration and pressure, both are common assumptions. The equation for approximating this process is:

$$Q = P \frac{\Delta p A}{t}$$

where Q is the volume flow (m³=sec) through the membrane, Δp is the difference of the gases partial pressure between the feed and permeate side of the membrane, t is the thickness of the membrane, A is the surface area and P is the diffusive gas permeability coefficient $$P = D*S$$

Here D is the diffusion coefficient, and S is the solubility coefficient. Permeability values are often expressed in a wide range of units (barrer, cm³(STP)/(cm*s*mmHg), mL(STP)*mm/(m²*day*atm), etc.). In some embodiments, SI units are used for P (m³(STP)*m/(m²*s*Pa).

For the sake of simplifying the model, convection on the permeate side of the membrane is assumed to be zero. This gives the assumption that the mass fraction of methane on the permeate side is approximately 1, causing the model to be dominated by pressure. This is a reasonable assumption because the partial-pressure differential across the pressure vessel is very large. In a real system, even on the bottom of a fast-moving car, permeation rates will only be slightly higher than in this simplified system. Beginning by examining cylindrical tubes with no bends the surface area A is calculated from the tank's volume (V), inner radius ($r_i$), and wall thickness (t):

$$A = 2\pi r_{avg} L = V \left(\frac{2r_i + t}{r_i^2}\right)$$

Yielding the equation:

$$Q = P \Delta p V \left[\frac{2}{tr_i} + \frac{1}{r_i^2}\right]$$

Three metrics can be used to determine if diffusion through the tank walls is a limiting factor: human safety, environmental impact, and perceived comfort. Methane is explosive when it is present in atmospheric concentrations between 5% and 15%. It is unsafe to be in a space with a methane concentration of more than 1%. If the worst air change rate case for a sedan cabin of 3.5 m³ is used (1 changeover/hour); and it is assumed that every bit of gas that escapes the tank goes directly into the car cabin, it can be calculated if a design is acceptable.

Permeation also needs to be considered. the ANSI/CSA NGV2-2007 16.12 Permeation Test requires that the steady state permeation for the tank be no more than 0.25 cc hour per liter water capacity of the container. ISO 11439:2000 has the same requirement. Further, the global warming potential of the diffused Methane should be considered in relation to the global warming potential of the Carbon Dioxide emitted from internal combustion vehicles. According to the EPA (as of 1997), the average passenger car consumes 550 gallons of gasoline, and emits 4,500 kg of $CO_2$ each year. Methane has 25 times the global warming potential of CO2. The disclosed Methane gas intestine will need to emit less than 180 kg of methane/year. Design choices can make it so that greenhouse gas emissions due to diffusion from the small radius tank will be much less than the greenhouse gas emissions from an internal combustion engine.

Although Methane is an odorless gas, Methane suppliers often add other chemicals to Methane such as hydrogen sulfide to make the gas smell noticeable. There is a concern that diffused methane will smell before health concerns become a risk. If consumers can smell the gas, they will be distrustful of the technology, limiting its market viability. This threshold will need to be examined based on common aromatic gases that are added to methane. The effects of adding fiber reinforcement to polymers is not entirely understood. It is generally understood that wet layup FRPs have between 2 and 10 times the permeability of a pure polymer barrier. This effect increases as more layers are added to the composite. One explanation is that the wet layup process with fibers introduces voids that expedite diffusion. If this is the case, then vacuum layups or other layup techniques could reduce voids, reducing permeation. A factor of ten increase in permeability could rule out FRPs as a design option.

In some embodiments, a design goal is a variable radius cylinder which starts out with a large radius r0 and shrinks to a small radius r1<r0. The mean curvatures at the ends are 1=r0 and 1=r1. When the radius starts to shrink, the curvature in the axial direction changes from zero to positive, increasing the mean curvature. Since the amount of bending force is roughly proportional to mean curvature, higher mean curvature means a higher pressure can be resisted.

Unfortunately, eventually the taper must become concave in the axial direction in order to meet up with the smaller cylinder, causing a decrease in the mean curvature which must be countered by a smaller radius. This raises the question of the fastest possible taper that stays within a given mean curvature bound.

Let z be the distance along the axial direction, r=r(z) the variable radius and define:

$$E=1+R_z^2$$

The mean curvature is given by $$H = \frac{1}{2r\sqrt{E}} - \frac{r_{zz}}{2E^{3/2}}$$

The mean curvature of the large cylinder is $\frac{1}{2}r_0$, so the space of curves satisfying $H \geq \frac{1}{2}r_0$ needs to be understood. Extremal curves where equality holds are therefore solutions to $$H = \frac{1}{2r_0}$$

$$\frac{1}{2r\sqrt{E}} - \frac{r_{zz}}{2E^{3/2}} = \frac{1}{2r_0}$$

$$r_0 E - r_{zz} r r_0 = r E^{3/2}$$

$$r_{zz} r r_0 + r E^{3/2} - r_0 E = 0$$

This equation appears impossible to solve analytically, but is easy to treat numerically. One solution option is a convex shape such as a partial spherical cap. Another solution option is to use single constant mean curvature curve with mean curvature larger than $\frac{1}{2}r_0$, chosen such that the ratio between the minimum and maximum radii is $r_0/r_1$. There are likely further options, so further criteria are needed to pick out the best one.

Examining the extreme cases of objects with no curvature in one direction establishes that having a constant mean curvature does not guarantee that stress is maintained as constant. Instead, a pair of coupled equations generated from examining differential, axi-symmetrical elements can be used to create curves of continuously varying stress when revolved and pressurized. Performing a transformation from cylindrical coordinates to cartesian coordinates yields equations below as discussed in relation to FIG. 6C, obtaining a first and second piola-kirchhoff stress in relation to the cauchy stress tensor in the 'undeformed' material.

Figure 6A:
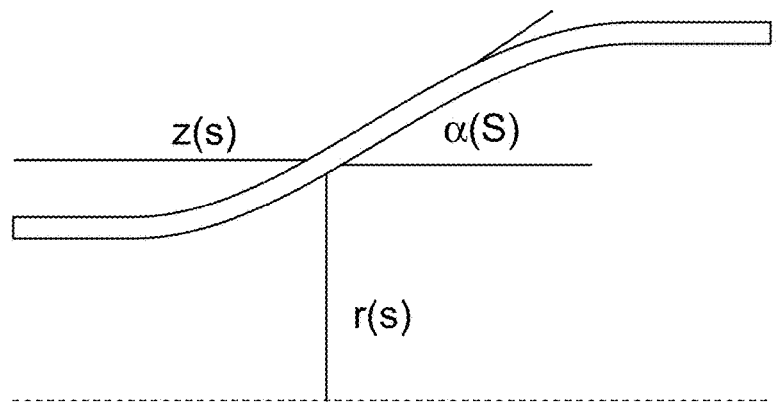
FIG. 6A is a diagram illustrating an embodiment of a parameterization of a revolved curve.

FIG. 6A is a diagram illustrating an embodiment of a parameterization of a revolved curve. In the example shown, s represents the length travelled along the curve. The function, r(s) represents the radius of the revolved curve, and z(s) represents the z position of the revolved curve. Function α(s) represents the angle with respect to the z-axis. Function $α_s(s)$ represents the derivative of the angle with respect to s at the location s along the curve.

Figure 6B:
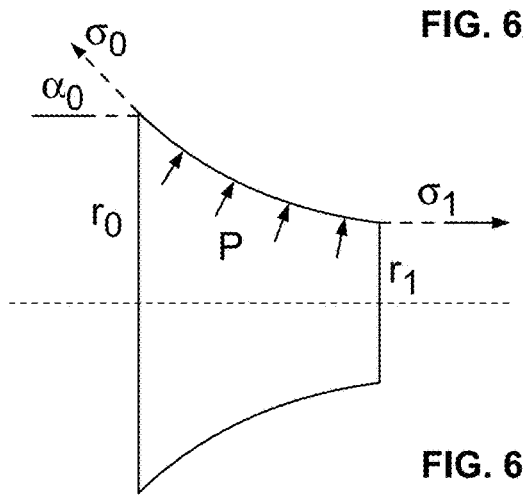
FIG. 6B is a diagram illustrating an embodiment of a differential element along the length of a tube.

FIG. 6B is a diagram illustrating an embodiment of a differential element along the length of a tube. In the example shown, a tube has radius $r_0$ on the left side and $r_1$ on the right side. P is the internal pressure. The angle $α_0$ is the angle with respect to the axis line of the differential element as it meets the tube with radius $r_0$. The stress as the differential element meets the tube with radius $r_0$ is $α_0$, and the stress as the differential element meets the tube with radius $r_1$ is $σ_1$.

Figure 6C:
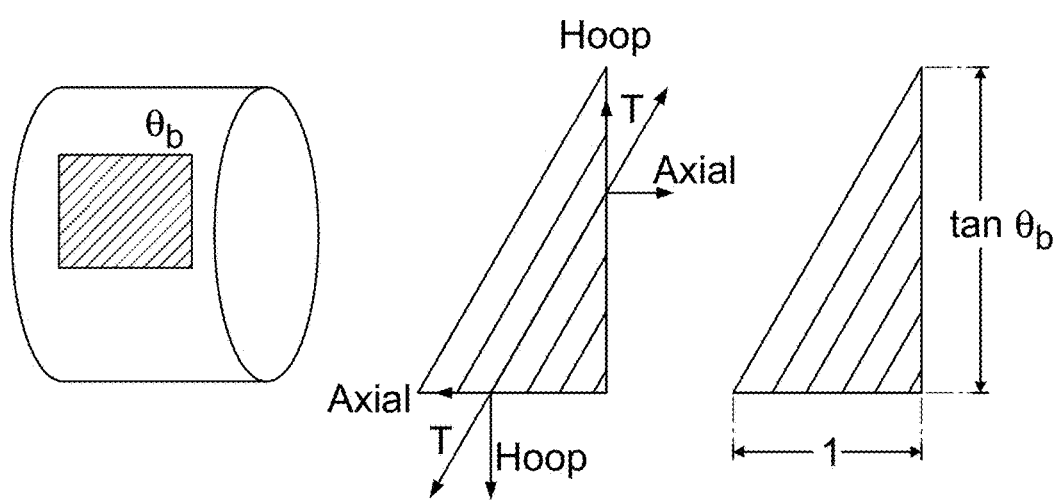
FIG. 6C is a diagram illustrating an embodiment of a tapered braid geometry.

FIG. 6C is a diagram illustrating an embodiment of a tapered braid geometry. In the example shown, $θ_b$ is the braid angle, T is the tension in the fibers, and l is a length in the axial direction.

$$P = J\nabla F^{-T}$$

$$S = JF^{-1}\sigma F^{-T}$$

$$F = \nabla p$$

$$p = [r(s)\cos(\theta), r(s)\sin(\theta), z(s)]$$

$$J = \det F$$

In the equations above, p is the curve parameterized by s (the length travelled along the curve), and J is the Jacobian. Since the Jacobian is 1, $$P = FS$$

The fact that the first piola-kirchhoff tensor represents the cylindrical stresses on a cartesian plane can be used to apply the divergence theorem in cylindrical coordinates to get the equation:

$$-cn = \nabla_{sa} \cdot P = P_s^s + \frac{r_s}{r}P^2 + \frac{1}{r}P_\theta^\theta$$

Where c is the ratio internal pressure/wall thickness, and n is the normal vector $$n = [\cos(\alpha)\cos(\theta), \cos(\alpha)\sin(\theta), -\sin(\alpha)\cos(\theta)]$$

This gives us the system of equations:

$$-c\begin{bmatrix}\cos(\alpha)\cos(\theta)\\ \cos(\alpha)\sin(\theta)\\ -\sin(\alpha)\cos(\theta)\end{bmatrix} = S_s^{ss}\begin{bmatrix}\sin(\alpha)\cos(\theta)\\ \sin(\alpha)\sin(\theta)\\ \cos(\alpha)\end{bmatrix} +$$

$$S^{ss}\begin{bmatrix}\alpha_s\cos(\alpha)\cos(\theta) + \frac{1}{r}\sin^2(\alpha)\cos(\theta)\\ \alpha_s\cos(\alpha)\sin(\theta) + \frac{1}{r}\sin^2(\alpha)\sin(\theta)\\ -\alpha_s\sin(\alpha) - \frac{1}{r}\cos(\alpha)\sin(\alpha)\cos(\theta)\end{bmatrix} + \frac{S^{aa}}{r}\begin{bmatrix}-\cos(\theta)\\ \sin(\theta)\\ 0\end{bmatrix}$$

which can be simplified by evaluating the system at $\theta=0$ $$-c\begin{bmatrix}\cos(\alpha)\\ 0\\ -\sin(\alpha)\end{bmatrix} =$$

$$S_s^{ss}\begin{bmatrix}\sin(\alpha)\\ 0\\ \cos(\alpha)\end{bmatrix} + S^{ss}\begin{bmatrix}\alpha_s\cos(\alpha) + \frac{1}{r}\sin^2(\alpha)\\ 0\\ -\alpha_s\sin(\alpha) - \frac{1}{r}\cos(\alpha)\sin(\alpha)\end{bmatrix} + \frac{S^{aa}}{r}\begin{bmatrix}-1\\ 0\\ 0\end{bmatrix}$$

This system of differential equations can be simplified by canceling the $S_s^{ss}$ terms to yield the relationship:

$$\frac{S^{ss}\alpha_s}{\cos(\alpha)} - \frac{S^{aa}}{r} = -\frac{c}{\cos(\alpha)}$$

which defines the relationship between axial and hoop stress for any axi-symmetric pressure vessel. Another equation for $S^{ss}$ can be derived from applying conservation of momentum to a differential element of varying radius:

$$2\pi r_1 \cos(\alpha_1)\sigma|_{s1} - 2\pi r_0 \cos(\alpha_0)\sigma|_{s0} - 2\pi c f_{s0}^{s1} r(s)\sin(\alpha(s))ds = 0$$

Substituting $\sin(\alpha(s))ds = dr$ and evaluating the integral, the following relationship is found:

$$rS^{ss}\cos(\alpha) - cr^2/2 = \text{const}$$

Since any physical pressure vessel must eventually have a radius of zero to close the volume, the constant must always be equal to zero. Therefore, the following relationship is derived for axial stress:

$$S^{ss} = \frac{Pr}{2t\cos\alpha}$$

Therefore, a closed form solution for $S^{aa}$ as well:

$$S^{aa} = \sigma_{hoop} = \frac{Pr}{t\cos(\alpha)} + \frac{Pr^2\alpha_s}{2t\cos^2(\alpha)}$$

The hose angle for any geometry is then.

$$\theta_{hose} = \arctan\sqrt{2 + \frac{r\alpha_s}{\cos(\alpha)}}$$

The above equation demonstrates that a line which is constrained to have $\alpha_s=0$ at the junction with a cylinder will have a continuously varying braid angle without any discontinuities. Any curve which has a continuously varying curvature (e.g., with no discontinuity in the change of curvature), tangential angle, and radius and satisfies $\alpha(0)=0$, $\alpha_s(0)=0$, $\alpha(\text{end})=0$, and $\alpha_s(\text{end})=0$ when revolved around the axis of symmetry, will allow for the construction of a taper with continuously varying braid angle.

This taper is created by establishing the necessary boundary conditions and generating a curve that matches either the hoop or axial stress of the larger cylinder according to the coupled ordinary differential equations (ODEs) below. That curve is then revolved around a central axis and subsequently braided over to create a composite without any discontinuities in braid angle.

$$-c\begin{bmatrix}\cos(\alpha)\\ 0\\ -\sin(\alpha)\end{bmatrix} =$$

$$S_s^{ss}\begin{bmatrix}\sin(\alpha)\\ 0\\ \cos(\alpha)\end{bmatrix} + S^{ss}\begin{bmatrix}\alpha_s\cos(\alpha) + \frac{1}{r}\sin^2(\alpha)\\ 0\\ -\alpha_s\sin(\alpha) - \frac{1}{r}\cos(\alpha)\sin(\alpha)\end{bmatrix} + \frac{S^{aa}}{r}\begin{bmatrix}-1\\ 0\\ 0\end{bmatrix}$$

In some embodiments, a taper to a reduced radius section of a tube has a continuously varying curvature. In some embodiments, the continuously varying curvature enables the targeting of an optimized braid angle for the overbraid. For example, the optimized braid angle helps maintain the desired shape of the tube (and the braid) under pressure after being bent into desired shape from a straight shape (e.g., the braid does not later move or deform significantly). In some embodiments, this enables a dry braid to be used. In some embodiments, a taper targets optimization of the internal volume of the bend without exceeding a stress maximum of the bend.

Working with a braiding machine will allow building prototypes of both a snake design and a spiral. The spiral design requires tapering of the braid, and bending the braid before laying it in a mold and curing it. Below a braid is described that reduces diameter and maintains hose angle. The hose angle is defined here to be the fiber angle that equalizes hoop and axial stress. A prototype of a square spiral can be achieved using a triaxial braid with helical third axis.

With full control over the mandrel feed rate (v) and carrier angular velocity (ω) it is possible to create a tapered braid that maintains stress equilibrium in the fibers over the taper. This builds on the definition of the hose (or ideal) angle established above. A definition of hose angle is developed for tapered braids. In a braided pressure vessel, the axial force and hoop force should be in equilibrium. This is achieved by adjusting the braid angle ($\theta_b$) such that the portion of hoop force and axial force in the braid fibers is equally carried by the tension in the fiber. Since the hoop force is a function of cone radius, angle, and curvature we expect that the braid angle will be as well. In a traditional, cylindrical, pressure vessel this angle takes on a single value (arctan $\sqrt{2}$) and is called the 'hose' angle (the braid angle of a braided fire hose). To find the 'hose' angle for a cone we assume square cross-section braid fibers with thickness t. The axial stress balance for the fibers is given by:

$$T \sin \theta_h = \sigma_{axial} \tan \theta_h$$

The hoop stress balance for the fibers is:

$$T \cos \theta_h = \sigma_{hoop}$$

dividing and solving for $\theta_h$ we get:

$$\theta_h = \arctan \sqrt{\frac{\sigma_{axial}}{\sigma_{hoop}}}$$

Braiders will be able to use this equation to dynamically set machine parameters and keep that braid angle ideal throughout the braiding process. Although it is likely that braiders will use this relationship to determine the parameters for their specific machine, a general way is developed here to translate between ideal braid angle and angular velocity of carriers ($\omega$), and take-up speed (v). A basic equation for braid angle would be:

$$\theta_b = \arctan(\omega R/v)$$

Solve for $\omega/v$ to get a relationship between braid radius and the ratio of carrier angular velocity to take-up speed.

$$\frac{v}{\omega} = \frac{1}{R}\sqrt{\frac{\sigma_{axial}}{\sigma_{hoop}}}$$

Given a function R(z), that is the shape of the mandrel along the z axis, an equation is obtained for the takeup speed at a fixed carrier frequency as a function of mandrel position.

The cover fraction ($c_f$) is the fraction of the surface area of a composite braid that is covered by fiber. In pressure vessels, having a cover factor that is too small will result in excessive radial shear stresses acting on the diamond shaped interstices in between the fibers of a biaxial weave. Those interstices are triangular in a tri-axial weave. When the shear forces exceed the shear strength of the matrix, the structure fails as the interstices 'blow out.' A geometric function of the minimum acceptable cover factor is defined assuming ideal braid angle and isotropic matrix. The blow-out force on a unit diamond (the space defined by the area between the middle of the yarn for four interlacing fibers) is equal to the area in between the fibers which is defined as:

$$A = \frac{2}{\tan\theta}\left(\frac{2\pi R}{n} - \frac{w}{2\cos\theta}\right)$$

Where A is the area between the fibers, $\theta$ is the braid angle, R is the radius of the tube, n is the number of carriers, and w is the width of the carriers. This force is applied in shear across the diamond. Due to scaling laws (surface area vs. edge length), the largest shear stress will be experienced at the boundary of the interstitial diamond. The perimeter of the area is defined by the fiber geometry as:

$$l = \frac{4}{\sin\theta}\left(\frac{2\pi R}{n} - \frac{w}{2\cos\theta}\right)$$

Since stress is the ratio between force and area:

$$\tau_{yield} > \frac{\text{force}}{\text{area}} = \frac{PA}{lt}$$

$$\tau_{yield} > \frac{P\cos\theta}{2t}\left(\frac{2\pi R}{n} - \frac{\omega}{2\cos\theta}\right)$$

$$\tau_{yield} > \frac{P(4\pi R\cos\theta - \omega n)}{4tn}$$

Where P is the pressure inside the vessel, and t is the thickness of the epoxy
Including the geometric definition of coverage factor:

$$c_f = 1 - \left(1 - \frac{\omega n}{4\pi R\cos\theta}\right)^2$$

or $$\omega n = 4\pi R \cos\theta(1 - \sqrt{1-cp})$$

and using the equation for the optimal winding angle for the section of a cylindrical pressure vessel that is at a constricted radius relative to the widest section of tube:

$$\theta_{hose} = \arctan\sqrt{2 + \frac{r\alpha_s}{\cos(\alpha)}}$$

Where $R_o$ is the maximum radius of the pressure vessel, and $\alpha$ is the angle of the taper. The function of a minimum acceptable cover factor at a given radius reduction and the ideal braid angle is given by:

$$c_f = 1 - \left(1 - \frac{\tau_{yield}nt}{RP\pi\cos\theta}\right)^2$$

or $$c_f > 1 - \left(3 + \frac{R\alpha_s}{\cos\alpha}\right)\left(\frac{\tau_{yield}nt}{RP\pi}\right)^2$$

As long as the above inequality is true, within a factor of safety for $\tau_{yield}$, the material will not fail by having a blowout. The actual cover factor for the tapered braid can be calculated as above. It is assumed that the number of carriers (n) and the yarn width ($\omega$) are constant over the braid. At the largest radius ($R_o$) the cover factor is $C_o$ and the braid angle is $\theta_o$. It is convenient to define two constants:

$$A = \frac{C_0}{1 - \left(1 - \frac{B}{R_0\cos\theta_0}\right)}$$

where $$B = n\omega/(4\pi)$$

The cover factor is then $$c_f = A\left(1 - \left(1 - \frac{B}{R\cos\theta}\right)^2\right)$$

In some embodiments, the taper is braided using the 'hose' angle, $\theta_h$, and the ideal taper is:

$$c_f = A\left(1 - \left(1 - \frac{B}{R}\sqrt{3 + \frac{R\alpha_s}{\cos\alpha}}\right)^2\right)$$

Once the nominal radius is chosen, and the reduced radius (as well as values for the number of carriers and yard width), the inequality governing the risk of blowout is as follows:

$$c_f = A\left(1 - \left(1 - \frac{B}{R}\sqrt{3 + \frac{R\alpha_s}{\cos\alpha}}\right)^2\right) > 1 - \left(3 + \frac{R\alpha_s}{\cos\alpha}\right)\left(\frac{\tau_{yield}nt}{RP\pi}\right)^2$$

Figure 4A:
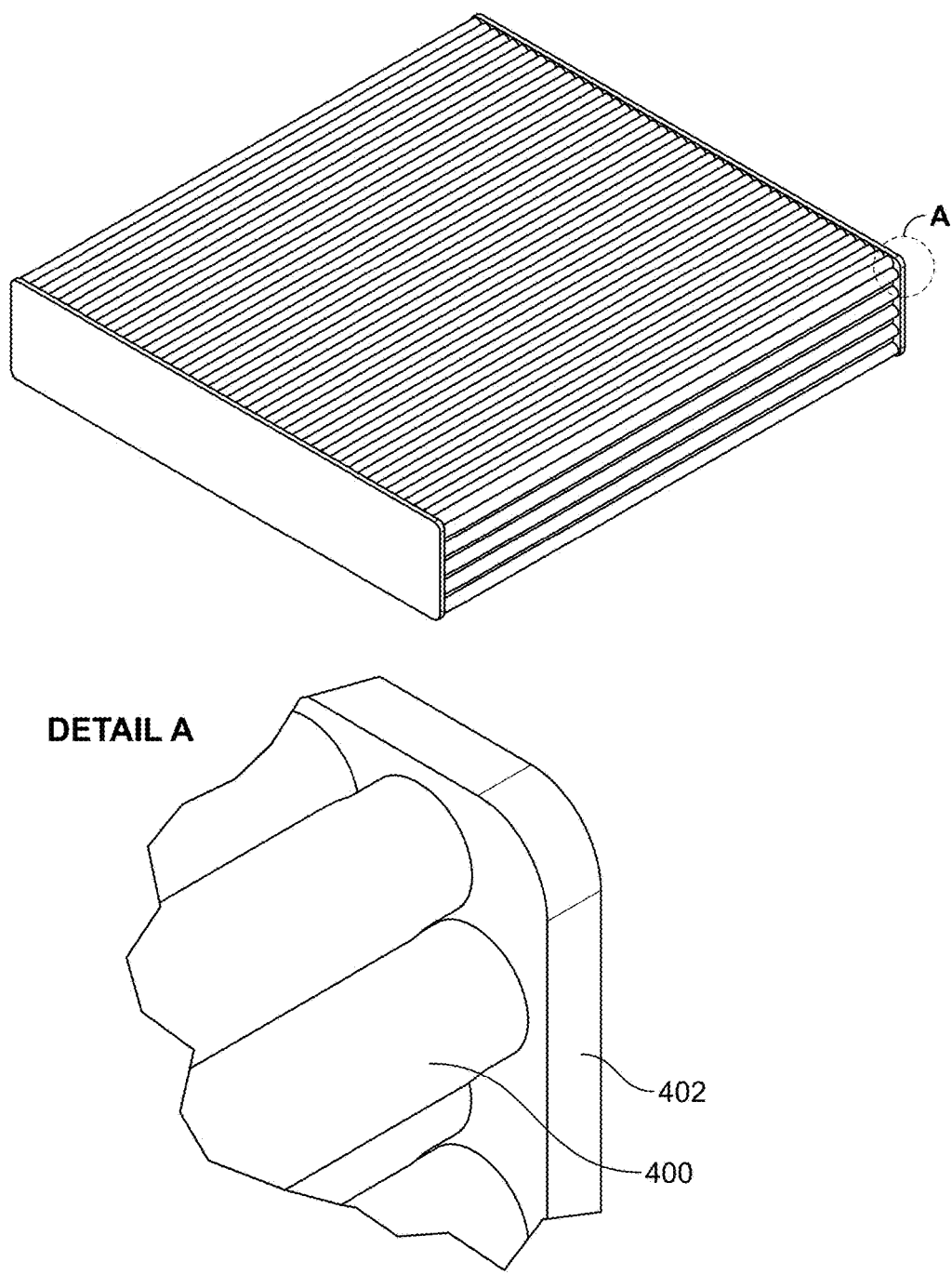
FIGS. 4A-4D are diagrams illustrating embodiments of tank construction with straight tubes.
Figure 4B:
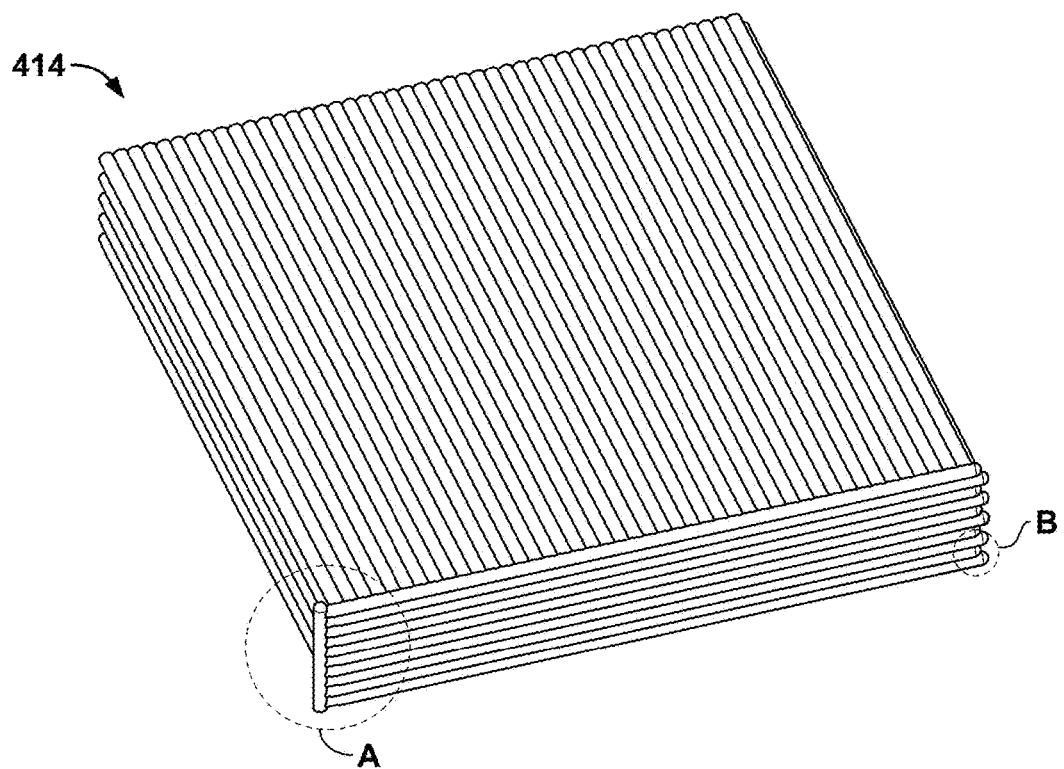
Figure 4B:
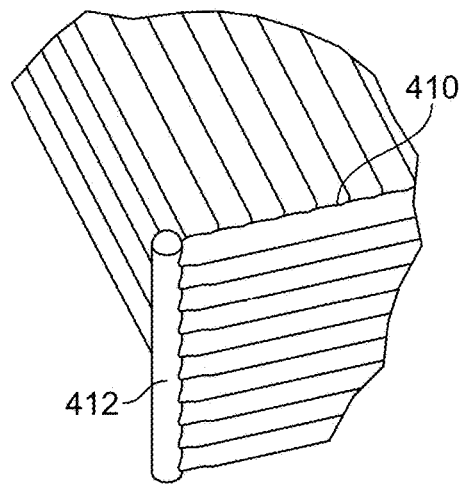
Figure 4B:
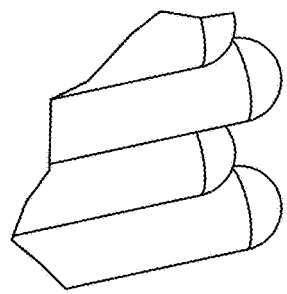
Figure 4C:
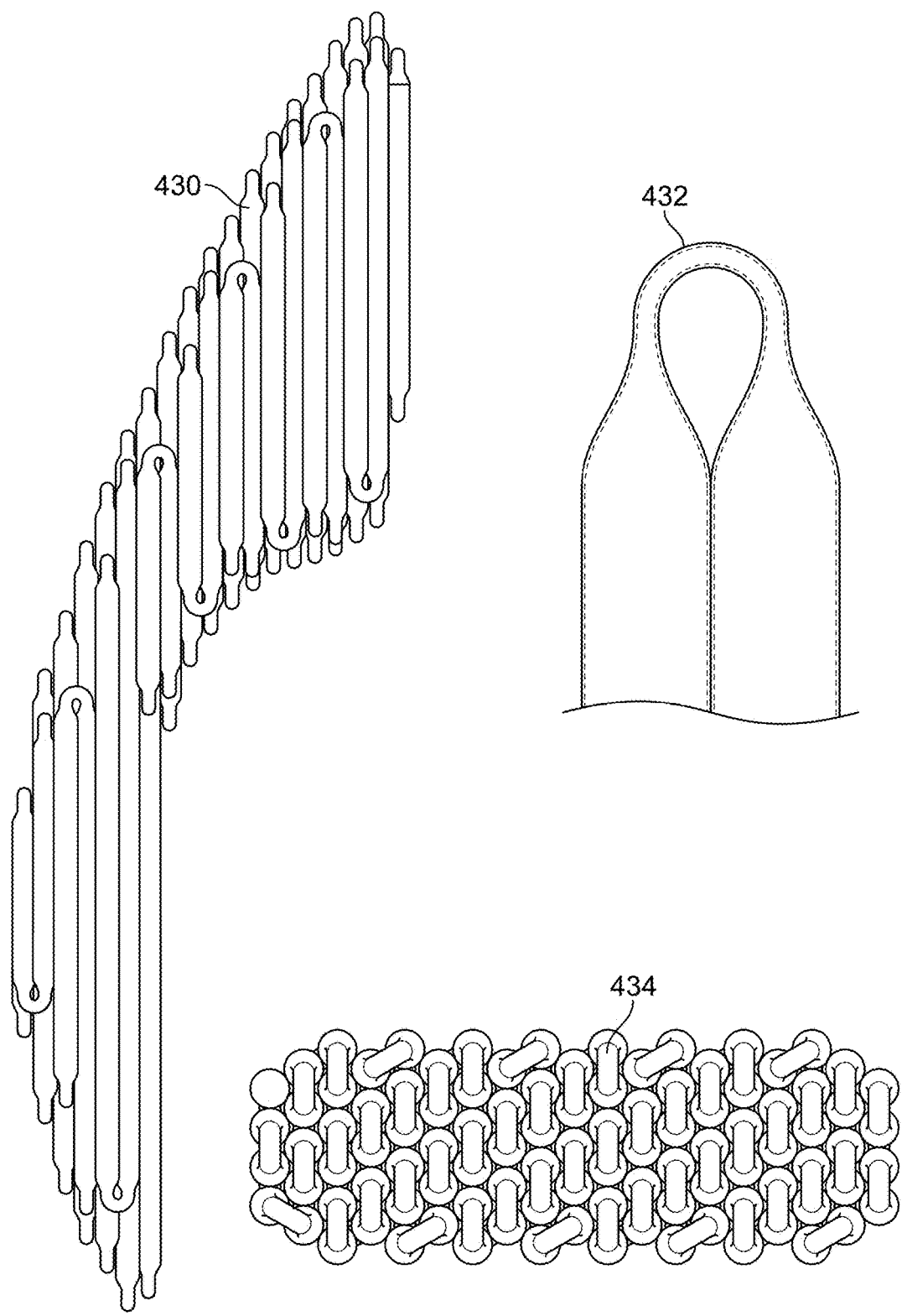
Figure 4D:
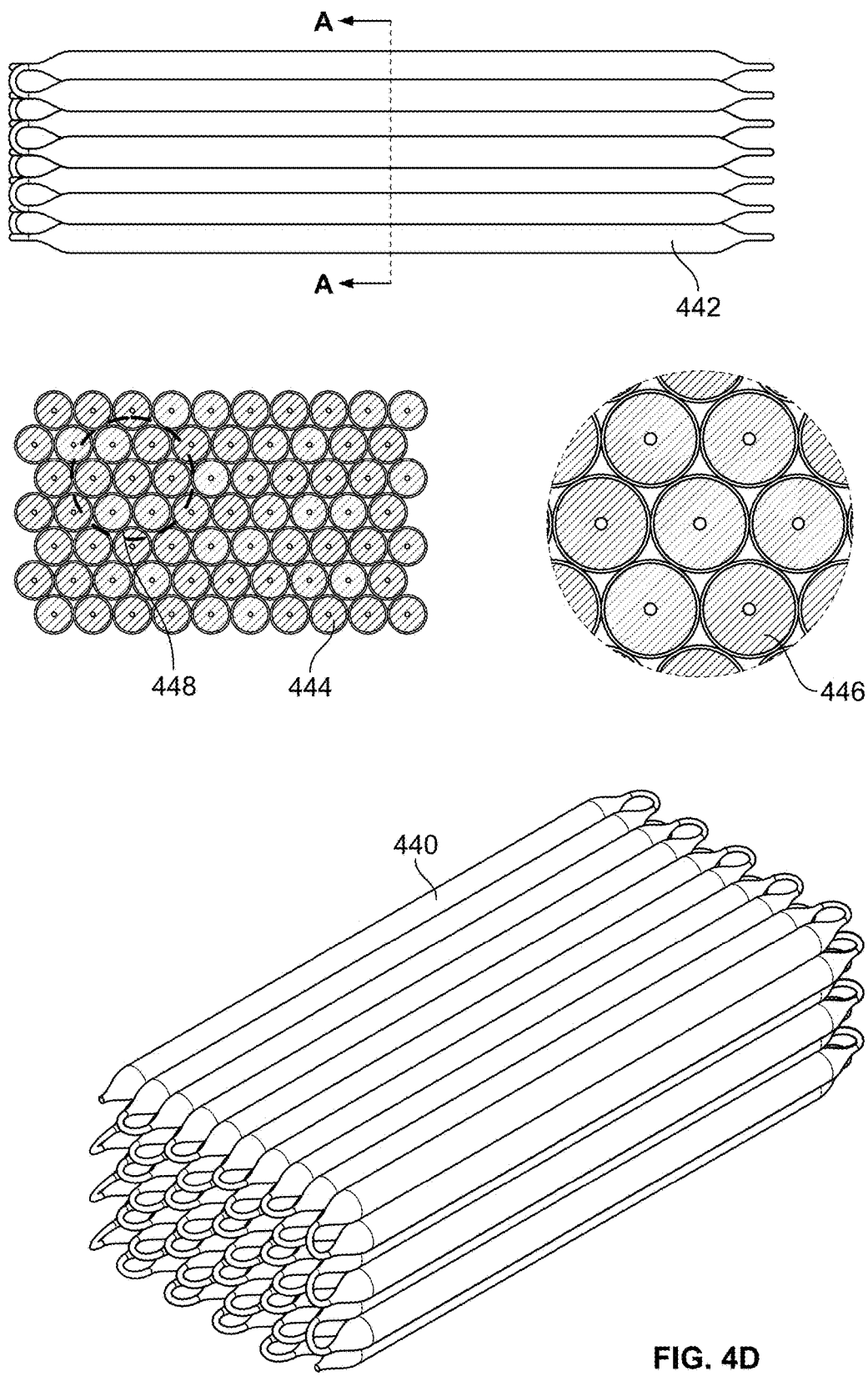

In some embodiments, a braided fiber based tank is constructed by over braiding a polymer liner. For example, the polymer liner is created as a single long tube with reduced sections that will bend when the tank is folded into shape. In some embodiments, a plurality of straight sections of tube comprise a single long tube with reduced radius sections. In some embodiments, the reduced radius sections comprise bent sections (e.g., where the reduction has considered the desired bending, wall thickness, spacing of the larger tubes, to make the desired packing without deformation of the bend section or mechanical failure when bending). In some embodiments, this liner can be formed as a single unit blow molded from a single die or with a set of discrete length dies. In some embodiments, the plurality of straight sections of tube comprise multiple long tubes with reduced radius sections that are joined together (e.g., sealed together). In some embodiments, the liner sections can be molded separately and connected with a smaller diameter tubes and sealed into a larger assembly as shown in FIG. 4C and FIG. 4D. The length of the chambered sections can be algorithmically determined to 'program' the final shape, which can be any desired shape. The liner is then braided over with a braiding machine in a single long length. In some embodiments, the plurality of straight sections of tube have overbraided fibers. In some embodiments, the overbraided fibers comprise a single long overbraid. In various embodiments, after braiding the tank is folded into shape and held together with a resin, over wrapped fibers, woven bag or mechanically constructed box, or any other appropriate holding manner. The liner acts both as a mandrel for braiding and as a barrier for gas diffusion. The shape of the reduction is created such that the ideal braid angle can be maintained over the entire length of the tank without discontinuities in the required angle.

All metal, type I, tanks are the lowest cost option for CNG storage. Metals manufacturing has a longer and more developed history than that of composites. Inexpensive and efficient methods for forging and forming metal geometries are common, readily accessible, and sufficiently vetted for safety and long term viability.

In some embodiments, the type I tank is a fully brazed-T-pulled designed. The fully brazed tank uses straight lengths of tube with tapered (swaged) ends. The ends are brazed onto a ball pulled tube in a bulk brazing process. Layers could be hexagonally packed and connected again using a ball pulled tube.

In some embodiments, the type I tank includes swaged straight tubes that are brazed onto U joints. Similar to the above design the joints will be easier to braze or weld. In some embodiments, it is possible to swage straight lengths of tube at the ends, tapering and increasing wall thickness enough to allow internal or external national pipe threads (NPT). Once threads are made hydraulic hose or small diameter thick walled tubing can be used to connect to the ends.

In some embodiments, it is possible to swage or otherwise form a tube so that the center of the tube has a reduced diameter. With special tooling a mandrel bender could be used to bend this tube into a snake. The snake would be a single layer of a larger, hexagonally packed. In some embodiments, it is possible to swage straight lengths of tube at the ends, tapering and increasing wall thickness enough to allow internal or external NPT threads. Once threads are made hydraulic hose or small diameter thick walled tubing can be used to connect to the ends.

In some embodiments, it is possible to swage or otherwise form a tube so that the center of the tube has a reduced diameter. With special tooling a mandrel bender could be used to bend this tube into a snake. The snake would be a single layer of a larger, hexagonally packed.

In some embodiments, in order to utilize current bending technology with minimum custom tooling a single diameter tube could be bent into a spiral. Spirals can stack hexagonally to allow for better packing density. One disadvantage of the spiral tank is that to achieve maximum packing density, the turns of the spiral need to be touching, which does not leave enough room for many tube-bending dies. By making one layer of a tank out of two (or more) spirals that have 1 diameter spacing between the turns and interlacing them at a 180 degree offset, you can achieve similar packing density to a tight spiral with relaxed manufacturing constraints.

In some embodiments, in order to achieve sufficient energy density for light vehicle applications, the tank must weigh <100 kg. To achieve this, high yield strength steels or aluminums are used. Because of complexities with joining aluminum alloys in some embodiments steel is selected. In some embodiments, brazing options are eliminated because of the inconsistency introduced from that number of brazed joints, as well as the difficulty in fixturing the assembly for batch brazing. A similar argument holds against mechanical fittings. In some embodiments, a bent snake is selected because of the lack of fittings or joins, but forming the reduced sections is challenging.

In some embodiments, a bent square spiral is a good design because of the convenience of having only quarter bends with relatively large bend radius. In various embodiments, bent square spirals are used for a tank where the bent square spirals comprise one of the following: a single long tube square spiral closely packed, a single sparse square spiral, a double-sparse square spiral, or any other appropriate spiral.

Figure 7A:
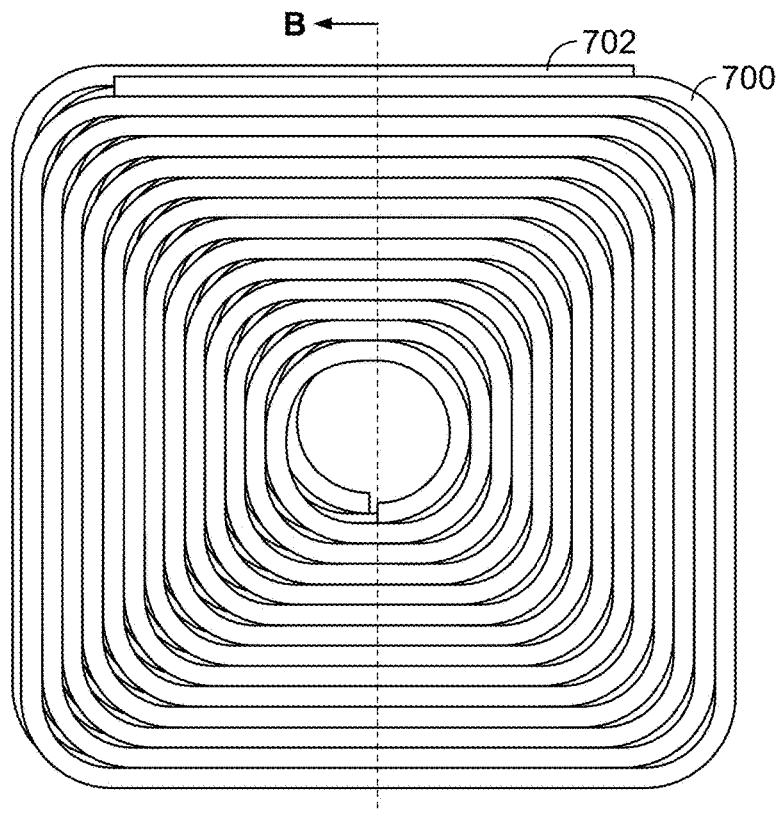
FIGS. 7A-C are diagrams illustrating embodiments of bent square spirals.
Figure 7B:
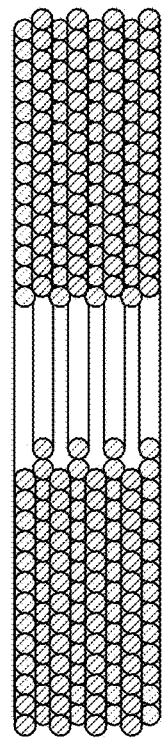
Figure 7C:
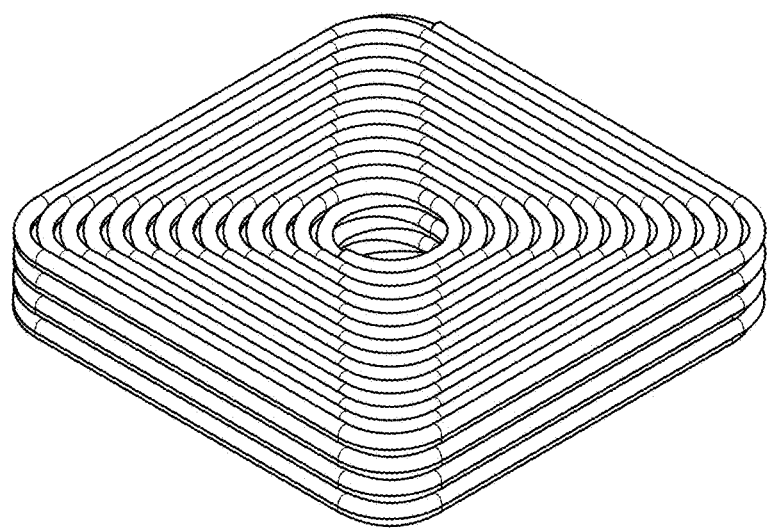

FIGS. 7A-C are diagrams illustrating embodiments of bent square spirals. In the example shown in FIG. 7A, bent square spiral 700 spirals inwards in a clockwise direction. The tube has 90 degree bends and is bent with no space between the tube as it spirals inward. Bent square spiral 702 spirals inwards in a counter clockwise direction. The tube has 90 degree bends and is bent with no space between the tube as it spirals inward. The alternating spirals (e.g., bent square spiral 700 and bent square spiral 702) are stacked to be hexagonally dense packed. In the example shown in FIG. 7B, a cross section view (e.g., similar to cut along B-B) is shown for eight alternating spirals stacked to achieve a hexagonal packing. In the example shown in FIG. 7C, a perspective view of the stack of alternating bent square spirals is shown. In some embodiments, straight sections are connected with 90° bends and are configured such that the bends make a spiral.

FIGS. 8A-C are diagrams illustrating embodiments of bent square spirals. In the example shown in FIG. 8A, bent sparse square spiral 800 spirals inwards in a counter clockwise direction. The tube has 90 degree bends and is bent with a single tube space between the tube as it spirals inward. Bent sparse square spiral 802 spirals inwards in a counter clockwise direction. The tube has 90 degree bends and is bent with a single tube space between the tube as it spirals inward. The alternating spirals (e.g., bent sparse square spiral 800 and bent sparse square spiral 802) are nested within each other to form a single layer of a stack. In the example shown in FIG. 8B, a cross section view (e.g., similar to cut along A-A) is shown for eight alternating nested spirals stacked to achieve a hexagonal packing. In the example shown in FIG. 8C, a perspective view of the stack of alternating bent nested square spirals is shown. In some embodiments, straight sections are connected with 90° bends and are configured such that the bends make a spiral.

Figure 9A:
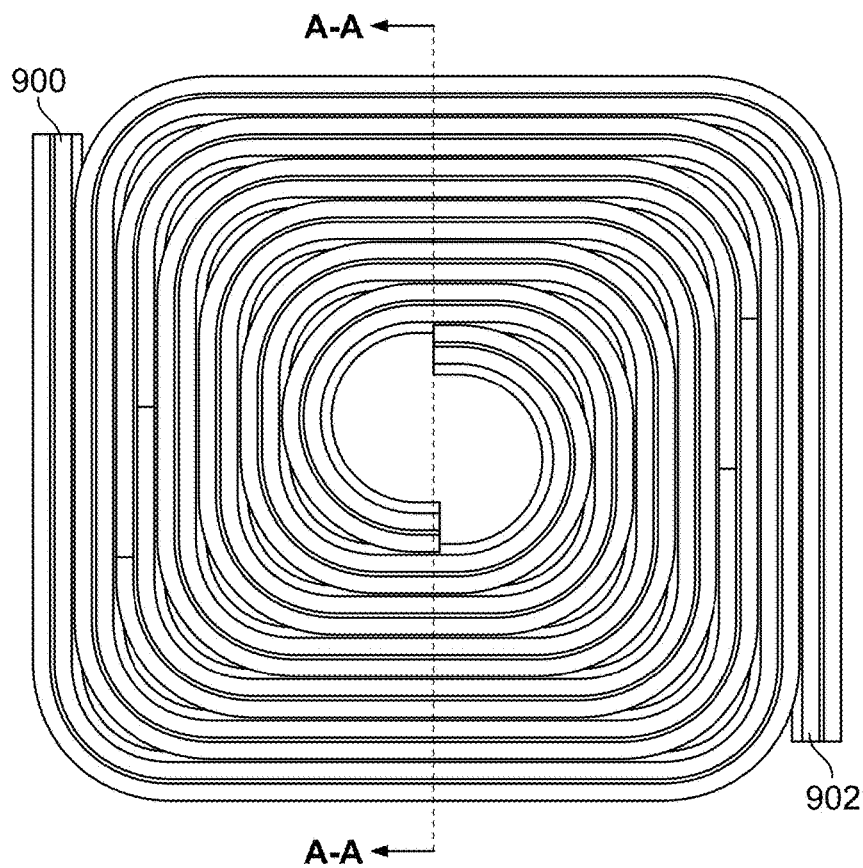
FIGS. 9A-C are diagrams illustrating embodiments of bent square spirals.
Figure 9B:
Figure 9C:
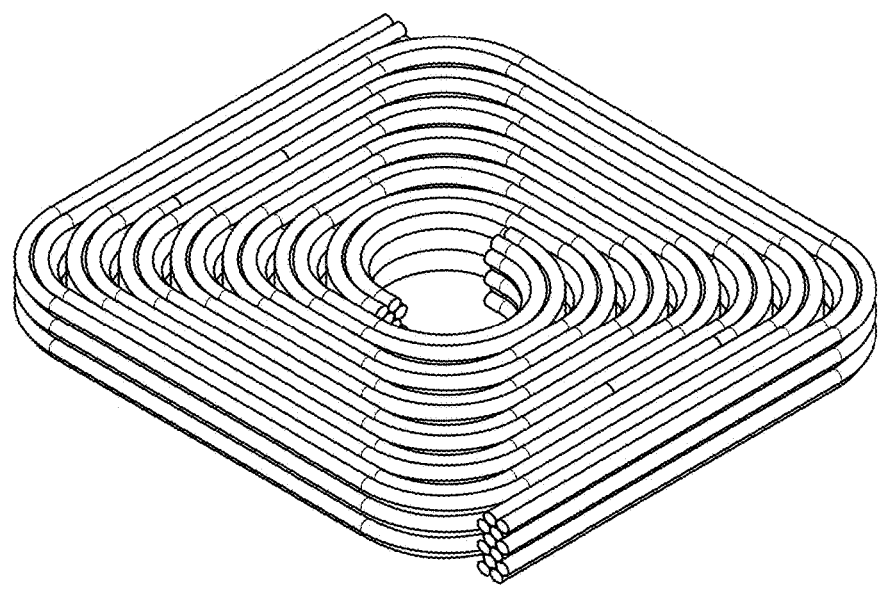

FIGS. 9A-C are diagrams illustrating embodiments of bent square spirals. In the example shown in FIG. 8A, bent double sparse square spiral 900 has two tubes that spiral inwards in a counter clockwise direction. The two tubes have 90 degree bends and are bent with a double tube space between the two tubes as they spiral inward. Bent double sparse square spiral 802 has two tubes that spiral inwards in a counter clockwise direction. The two tubes have 90 degree bends and are bent with a double tube space between the two tubes as they spiral inward. The alternating double spirals (e.g., bent double sparse square spiral 900 and bent double sparse square spiral 902) are nested within each other to form a single layer of a stack. In the example shown in FIG. 9B, a cross section view (e.g., similar to cut along AA-AA) is shown for six alternating nested spirals stacked to achieve a hexagonal packing. In the example shown in FIG. 8C, a perspective view of the stack of alternating bent nested double square spirals is shown. The double-sparse spiral has two uniquely bent tubes per half layer, with a total of four per layer. To achieve hexagonal packing units, four unique bent tubes are used, as layers stack with an alternating pattern, A B A B. The alternating layers are sized so that the layers stack to achieve a hexagonal dense pack. In some embodiments, the flat tank layers can then be layer into the chassis of a car or truck bed. In some embodiments, straight sections are connected with 90° bends and are configured such that the bends make a spiral. In some embodiments, the double sparse spiral can be extended to a sparse of an arbitrary number of sparse spirals. In some embodiments, the plurality of straight sections of tube comprise a bent sparse square spiral of multiple spirals in the same layer (e.g., double or 2, triple or 3, 4, 5, 6, etc.). In some embodiments, the bent sparse square spiral is nested with a second bent sparse square spiral of multiple spirals to form a sparse square layer. In some embodiments, the sparse square layer is stacked with another sparse square layer in a dense pack configuration.

Figure 10:
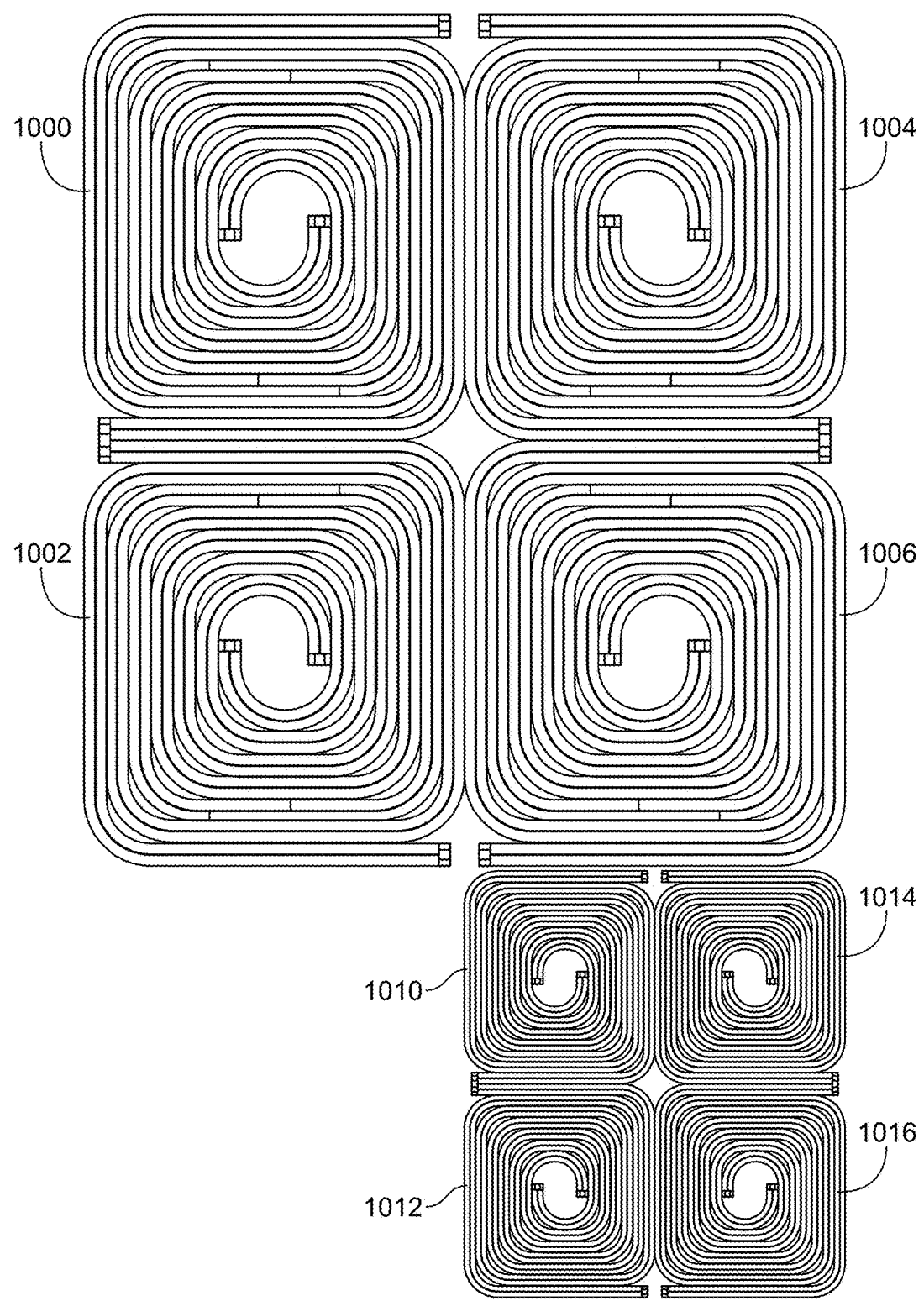
FIG. 10 is a diagram illustrating an embodiment of a group of flat spirals filling a two-dimensional layer.

FIG. 10 is a diagram illustrating an embodiment of a group of flat spirals filling a two-dimensional layer. In the example shown, a flat space is filled with 4 larger spirals (e.g., spiral 1000, spiral 1002, spiral 1004, and spiral 1006) and 4 smaller spirals (e.g., spiral 1010, spiral 1012, spiral 1014, and spiral 1016). The large spirals and the small spirals shown are double sparse nested square spirals. A three dimensional volume can also be filled with stacks of groups of flat spirals to fill any arbitrary volume efficiently.

In some embodiments, hexagonally packed fiber tube systems are used for tanks. A traditional carbon fiber structure can be made from straight carbon fiber reinforced polymer (CFRP) tubes with glued in end-caps. These end-caps might consist of "U" bends that join two adjacent tubes together. The straight tubes are pultruded in a continuous process, and the end caps made in a batch molding process. The wall thickness of the end of the pultruded tube is given a slight taper, which is matched by a slight taper in the end-cap. These elbows can be either composite or metal hydraulic hose.

In some embodiments, instead of depending on bond strength to hold the end-caps in place, it is possible to use external CFRP bands or through rods that run parallel to the pultruded tubes and take the full axial load, holding the end-caps in against the internal pressure. For this case, the pultruded tube need have circumferential fibers, and so can have a thinner wall thickness, the axial fiber requirement being shifted to the external bands or through rods.

In some embodiments, stacked spiral composite structures can be made by wet pultruding the carbon fiber weave over an ethylene vinyl alcohol (EVOH) liner and laying it into a two part spiral mold with a breather cloth. The EVOH liner is pressurized, and a vacuum is pulled over the mold to drive out any air, off-gas, and excess resin. The spiral tank layers is stacked and connected using a carbon spine that runs along the outer edge of the tank.

In some embodiments, a modular design of a long carbon fiber (CF) tube is laid into a square spiral. For example, a tube diameter is between 0.6"-2", and a bounding box is about 3'×3'. The spiral tanks are stacked hexagonally to form larger volumes.

In some embodiments, the densest packing with the most flexibility is to stack tubes hexagonally and simply connect the ends.

Figure 11:
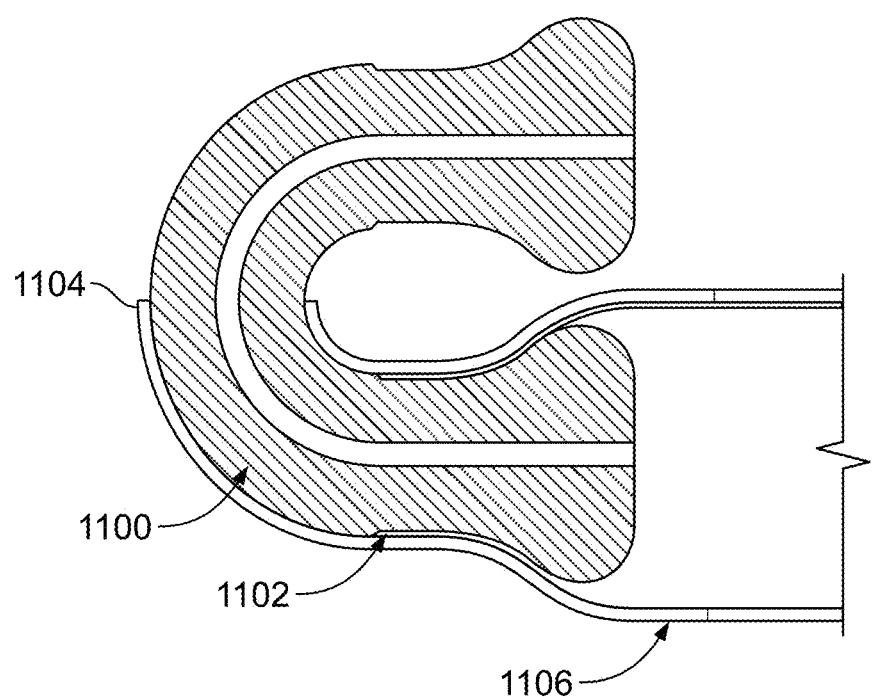
FIG. 11 is a diagram illustrating an embodiment of a flexible elbow.

FIG. 11 is a diagram illustrating an embodiment of a flexible elbow. In the example shown, connecting the ends of tubes uses a flexible elbow. Internal tube 1100 comprises a flexible internal rubber bend. Internal tube 1100 sits against internal liner 1102 of tube 1104. With a flexible elbow the straight lengths are braided over (e.g., using composite overwrap 1106) and bent before curing. In various embodiments, the flexible elbows comprise reduced sections of a plastic liner, attached sections of hydraulic hose, a composite rubber tube, or include any other appropriate elbow configuration.

In some embodiments, using a continuous internal liner as a mandrel, the entire tank is braided in a single process. The shape of the tank is 'programmed' into the liner such that reduced sections is bent into elbows after braiding.

In various embodiments, the tank is used to store other gases than natural gas and conform to a volume—for example, air, oxygen, carbon dioxide, nitrogen, or any other appropriate gas.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. An assembly for storing fluid, the assembly comprising:
a plurality of stacked tube assemblies for storing fluid, the tube assemblies including:
a tube that defines a planar body that coils from an edge portion of the body to a central portion of the body, the body including:
a first tube-end disposed at the edge portion of the body;
a plurality of straight tube sections;
a plurality of bend sections coupled to and between the straight tube sections; and
a second tube-end disposed at the central portion of the body,
wherein the assembly comprises a first layer defined by first, second, third and fourth tube assemblies disposed in the same plane, the first and second tube assemblies coiled in a clockwise or counter-clockwise configuration and the third and fourth tube assemblies coiled in the same configuration as the first and second tube assemblies.

2. The assembly of claim 1, wherein the first and second tube assemblies collectively define a double tube space as the first and second tube assemblies spiral inward.

3. The assembly of claim 1, wherein the third and fourth tube assemblies are nested in the first and second tube assemblies by the third and fourth tube assemblies being disposed within a double tube space defined by the first and second tube assemblies.

4. The assembly of claim 1, wherein the fluid comprises hydrogen gas.

5. An assembly for storing a combustible fuel fluid comprising:
a plurality of tube assemblies for storing combustible fuel fluid the tube assemblies stacked in a directly-adjacent layered configuration, the tube assemblies including:
a tube that defines a planar and rounded-rectangular body that coils from an edge portion of the body to a central portion of the body, the body including:
a first tube-end disposed at the edge portion of the body;
a plurality of straight tube sections;
a plurality of bend sections coupled to and between the straight tube sections; and
a second tube-end disposed at the central portion of the body,
wherein the assembly comprises a first layer defined by first, second, third and fourth tube assemblies disposed in the same plane, the first and second tube assemblies coiled in a clockwise or counter-clockwise configuration and the third and fourth tube assemblies coiled in the same configuration as the first and second tube assemblies.

6. The assembly of claim 5, wherein the first and second tube assemblies collectively define a double tube space as the first and second tube assemblies spiral inward.

7. The assembly of claim 5, wherein the third and fourth tube assemblies are nested in the first and second tube assemblies by the third and fourth tube assemblies being disposed within a double tube space defined by the first and second tube assemblies.

8. The assembly of claim 5, wherein the combustible fuel fluid comprises hydrogen gas.

9. An assembly for storing hydrogen gas comprising:
a plurality of tube assemblies for storing hydrogen gas, the tube assemblies stacked in a directly-adjacent layered configuration, the tube assemblies including:
a tube that defines a planar and rounded-rectangular body that coils from an edge portion of the body to a central portion of the body, the body including:
a first tube-end disposed at the edge portion of the body;
a plurality of straight tube sections;
a plurality of bend sections coupled to and between the straight tube sections; and
a second tube-end disposed at the central portion of the body,
wherein the assembly comprises a first layer defined by first, second, third and fourth tube assemblies disposed in the same plane, the first and second tube assemblies coiled in a clockwise or counter-clockwise configuration and the third and fourth tube assemblies coiled in same configuration as the first and second tube assemblies;
wherein the first and second tube assemblies collectively define a double tube space as the first and second tube assemblies spiral inward; and
wherein the third and fourth tube assemblies are nested in the first and second tube assemblies by the third and fourth tube assemblies being disposed within the double tube space defined by the first and second tube assemblies.

10. The assembly of claim 9, wherein a first subset of the plurality of bend sections define a 90-degree bend between respective straight tube sections and wherein a second subset of the plurality of bend sections define a 180-degree bend between respective straight tube sections.

11. The assembly of claim 9, wherein the bend sections and straight tube sections are defined by a tube having the same diameter.

12. The assembly of claim 9, wherein the rounded-rectangular body defines a square rounded-rectangular body.

13. The assembly of claim 9, wherein each straight tube section is disposed parallel to another straight tube section.

14. The assembly of claim 9, wherein each straight tube section is disposed parallel to and contacting another straight tube section along a respective length.

15. The assembly of claim 9, wherein a plurality of the bend sections are nested within a curve of another bend section.

16. The assembly of claim 9, wherein the body defines a central-orifice disposed at the central portion.

17. The assembly of claim 9, wherein the straight tube sections comprise an inner liner with an outer braided layer that completely covers an outer surface of the inner liner of at least one straight tube section.

18. The assembly of claim 9, wherein the straight tube sections and bend portions are defined by physically separable units that are coupled together to define a contiguous body.

19. A vehicle comprising a hydrogen gas fuel-tank comprising the assembly for storing hydrogen gas of claim 9.

* * * * *